(12) United States Patent
Murata et al.

(10) Patent No.: US 8,307,245 B2
(45) Date of Patent: Nov. 6, 2012

(54) SCENARIO CREATING APPARATUS, SCENARIO CREATING METHOD, AND STORAGE MEDIUM STORING SCENARIO CREATING PROGRAM

(75) Inventors: Noriaki Murata, Yokohama (JP); Tamami Sugasaka, Kawasaki (JP); Ken Yokoyama, Kawasaki (JP); Kazuhiro Ikemoto, Kawasaki (JP); Yasuo Kubota, Yokohama (JP); Junichi Sakaguchi, Kawasaki (JP); Naoki Akaboshi, Kawasaki (JP); Taiji Sasage, Yokohama (JP); Syogo Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 12/791,265

(22) Filed: Jun. 1, 2010

(65) Prior Publication Data
US 2010/0306595 A1    Dec. 2, 2010

(30) Foreign Application Priority Data

Jun. 2, 2009   (JP) .................................. 2009-132957

(51) Int. Cl.
*G06F 11/00* (2006.01)
(52) U.S. Cl. .............. 714/25; 709/224; 714/4.1; 714/31
(58) Field of Classification Search .................. 709/224; 714/4.1, 25, 31
See application file for complete search history.

(56) References Cited

U.S. PATENT DOCUMENTS

| | | | |
|---|---|---|---|
| 4,803,683 A * | 2/1989 | Mori et al. ...................... | 714/31 |
| 6,351,826 B1 | 2/2002 | Kato | |
| 6,657,641 B2 | 12/2003 | Tachibana et al. | |
| 6,988,208 B2 * | 1/2006 | Hrabik et al. .................... | 726/23 |
| 7,644,307 B2 * | 1/2010 | Musoll ............................ | 714/18 |
| 7,996,723 B2 * | 8/2011 | Levine et al. ................ | 714/38.1 |
| 2002/0178383 A1 * | 11/2002 | Hrabik et al. ................. | 713/201 |
| 2005/0289231 A1 | 12/2005 | Harada et al. | |
| 2006/0265416 A1 | 11/2006 | Seki et al. | |
| 2007/0228149 A1 | 10/2007 | Seki et al. | |
| 2007/0288226 A1 | 12/2007 | Higeta et al. | |
| 2008/0151760 A1 * | 6/2008 | Michl .......................... | 370/241 |
| 2009/0113244 A1 * | 4/2009 | Doshi et al. .................... | 714/25 |
| 2011/0030059 A1 * | 2/2011 | Greenwald .................... | 726/25 |

FOREIGN PATENT DOCUMENTS

| | | |
|---|---|---|
| JP | 11-177655 | 7/1999 |
| JP | 11-184900 | 7/1999 |
| JP | 2006-11683 | 1/2006 |
| JP | 2006-323471 | 11/2006 |
| JP | 2007-264810 | 10/2007 |
| JP | 2007-272693 | 10/2007 |

* cited by examiner

*Primary Examiner* — Joshua P Lottich
(74) *Attorney, Agent, or Firm* — Staas & Halsey LLP

(57) ABSTRACT

A scenario creating apparatus which creates a scenario for verifying operation of an information processing system in which a plurality of servers including a database server are connected, includes a collector that collects messages transmitted and received between the plurality of servers, when operation of the information processing system is being verified by a terminal apparatus that performs verification of operation; an association unit that associates the collected messages with each other; a sorter that sorts work models in ascending order of time at which access is made to the database server, the work models each being a group of the associated messages; and a scenario creating unit that creates the scenario on the basis of the sorted work models.

18 Claims, 31 Drawing Sheets

FIG. 4

| | REQUEST | RESPONSE |
|---|---|---|
| LOAD DISTRIBUTION APPARATUS ⇔ WEB SERVER | TIME STAMP AND HTTP REQUEST | TIME STAMP, HTTP RESPONSE, AND STATUS |
| | 200904..., http://aaa.bbb.ccc/webapps/... | 200904...,... |
| WEB SERVER ⇔ AP SERVER | TIME STAMP AND MESSAGE | TIME STAMP, MESSAGE, AND RETURN VALUE |
| | 200904..., Module/Interface/Operation.... | 200904...,... |
| AP SERVER ⇔ DB SERVER | TIME STAMP, SQL STATEMENT, CONTROL STATEMENT, ETC. | TIME STAMP, EXECUTION RESULT, AND RETURN VALUE |
| | 200904..., SELECT xxx FROM xxx WHERE xxx=xxx.... | 200904...,... |

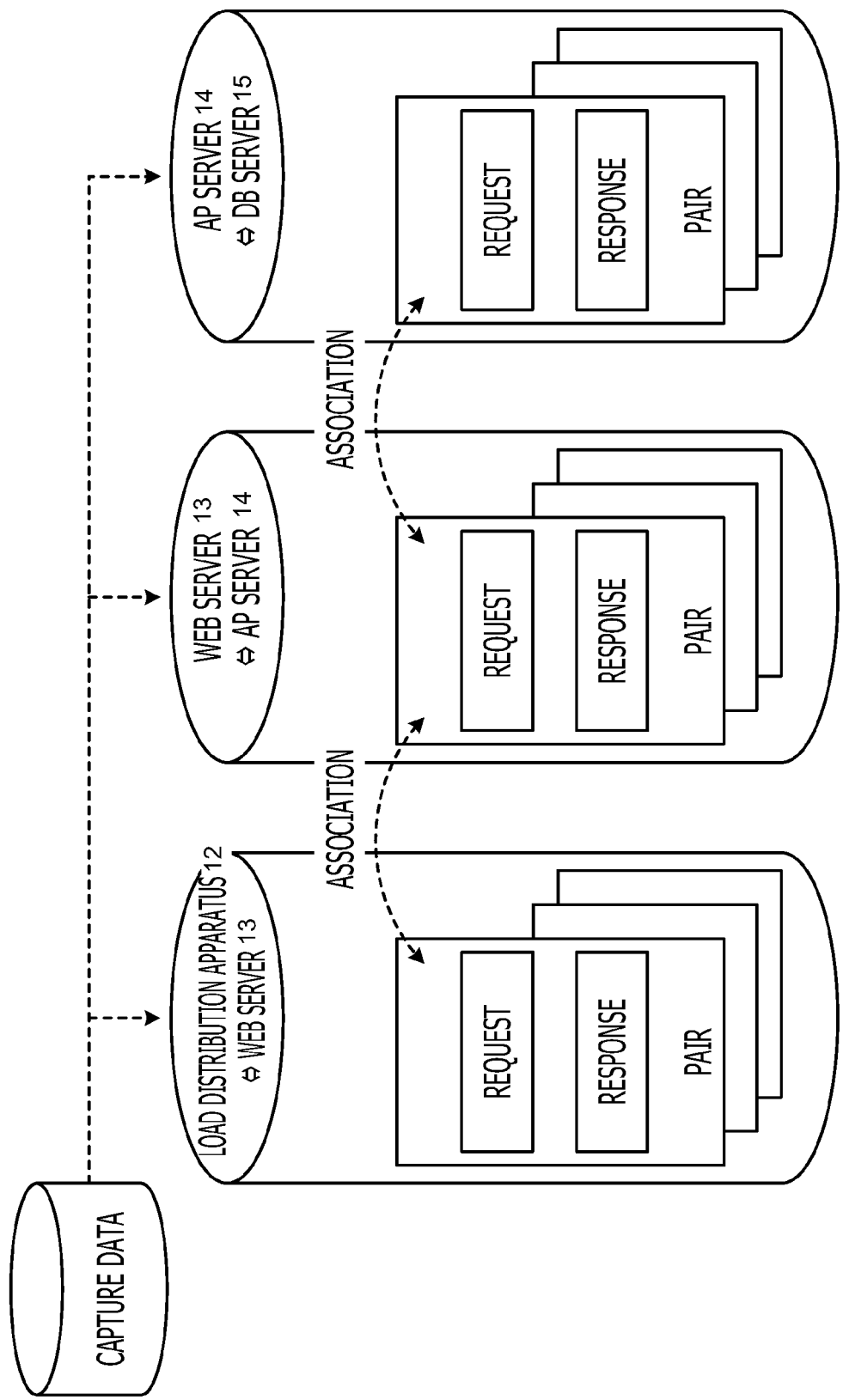

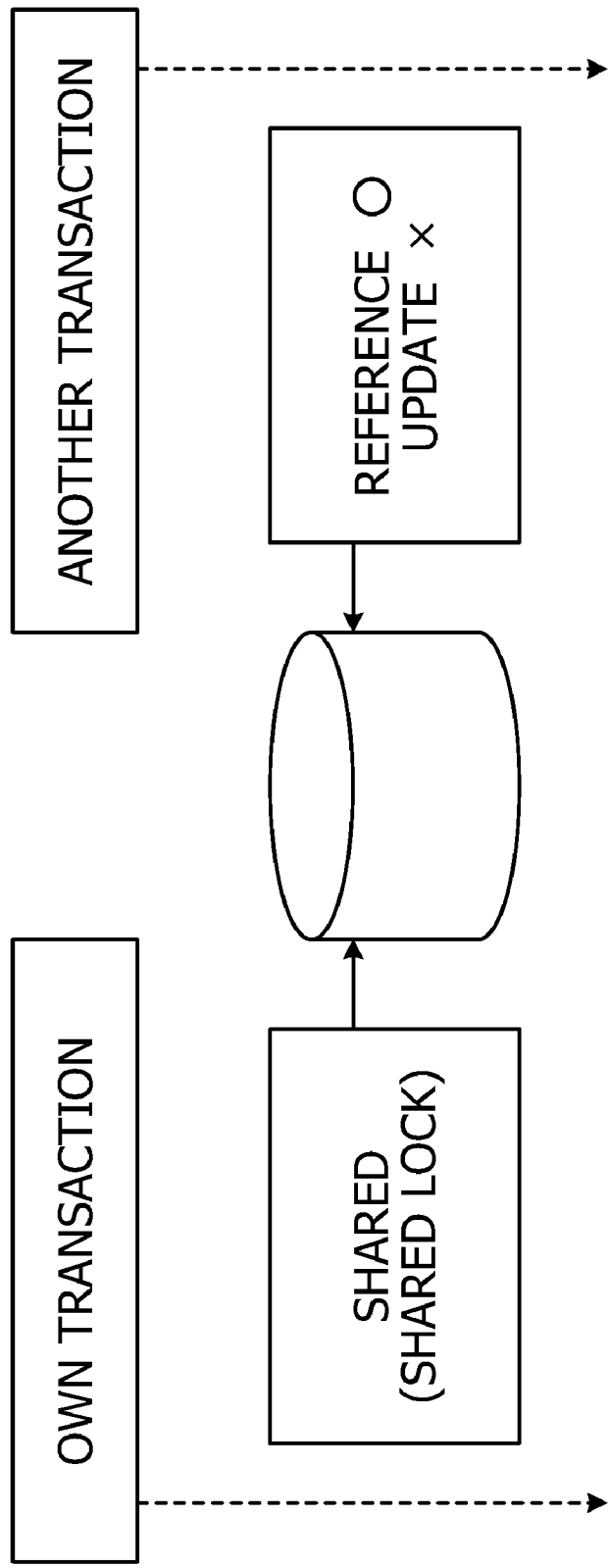

FIG. 9

| ATTRIBUTE OF CURRENT WORK MODEL | ATTRIBUTE OF IMMEDIATELY PRECEDING WORK MODEL | TABLES TO BE REFERENCED/UPDATED | SWAPPING |
|---|---|---|---|
| UPDATE TYPE (INCLUDING EXCLUSIVE LOCK) | UPDATE TYPE (INCLUDING EXCLUSIVE LOCK) | SAME | NOT PERFORM |
| | | DIFFERENT | NOT PERFORM |
| | REFERENCE TYPE (INCLUDING SHARED LOCK) | SAME | NOT PERFORM |
| | | DIFFERENT | NOT PERFORM |
| | REFERENCE TYPE (NO LOCK) | SAME | NOT PERFORM |
| | | DIFFERENT | NOT PERFORM |
| REFERENCE TYPE (INCLUDING SHARED LOCK) | UPDATE TYPE (INCLUDING EXCLUSIVE LOCK) | SAME | NOT PERFORM |
| | | DIFFERENT | PERFORM |
| | REFERENCE TYPE (INCLUDING SHARED LOCK) | SAME | NOT PERFORM |
| | | DIFFERENT | PERFORM |
| | REFERENCE TYPE (NO LOCK) | SAME | NOT PERFORM |
| | | DIFFERENT | PERFORM |
| REFERENCE TYPE (NO LOCK) | UPDATE TYPE (INCLUDING EXCLUSIVE LOCK) | SAME | NOT PERFORM |
| | | DIFFERENT | PERFORM |
| | REFERENCE TYPE (INCLUDING SHARED LOCK) | SAME | NOT PERFORM |
| | | DIFFERENT | PERFORM |
| | REFERENCE TYPE (NO LOCK) | SAME | NOT PERFORM |
| | | DIFFERENT | PERFORM |

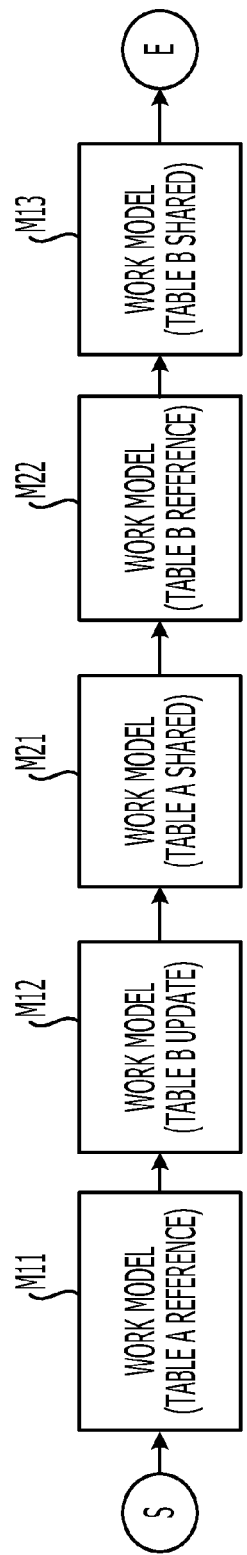
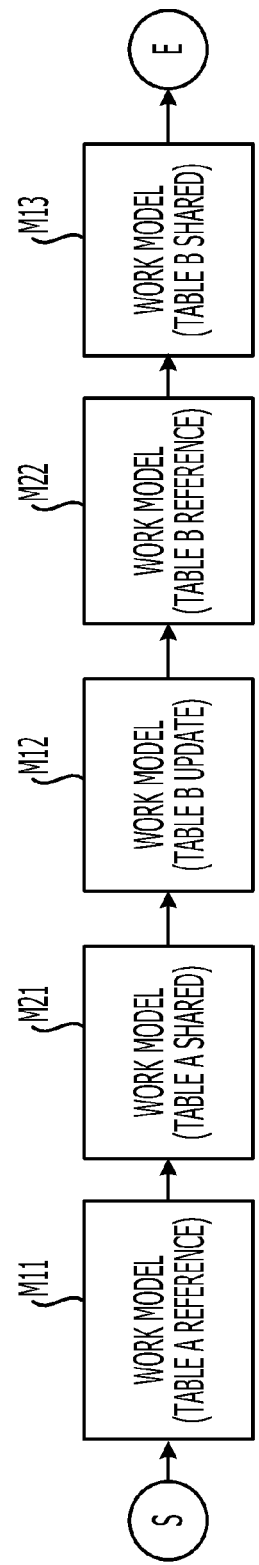
FIG. 10A
FIG. 10B

FIG. 11

| ATTRIBUTE OF CURRENT WORK MODEL | ATTRIBUTE OF IMMEDIATELY PRECEDING WORK MODEL | TABLES TO BE REFERENCED /UPDATED | SWAPPING | REMARKS |
|---|---|---|---|---|
| UPDATE TYPE (INCLUDING EXCLUSIVE LOCK) | UPDATE TYPE (INCLUDING EXCLUSIVE LOCK) | SAME | NOT PERFORM | |
| | | DIFFERENT | PERFORM | |
| | REFERENCE TYPE (INCLUDING SHARED LOCK) | SAME | NOT PERFORM | PERFORM SYNCHRONIZATION IMMEDIATELY BEFORE EXECUTING MULTIPLEXING |
| | | DIFFERENT | PERFORM | |
| | REFERENCE TYPE (NO LOCK) | SAME | NOT PERFORM | PERFORM SYNCHRONIZATION IMMEDIATELY BEFORE EXECUTING MULTIPLEXING |
| | | DIFFERENT | PERFORM | |
| REFERENCE TYPE (INCLUDING SHARED LOCK) | UPDATE TYPE (INCLUDING EXCLUSIVE LOCK) | SAME | NOT PERFORM | |
| | | DIFFERENT | PERFORM | |
| | REFERENCE TYPE (INCLUDING SHARED LOCK) | SAME | PERFORM | |
| | | DIFFERENT | PERFORM | |
| | REFERENCE TYPE (NO LOCK) | SAME | PERFORM | |
| | | DIFFERENT | PERFORM | |
| REFERENCE TYPE (NO LOCK) | UPDATE TYPE (INCLUDING EXCLUSIVE LOCK) | SAME | NOT PERFORM | |
| | | DIFFERENT | PERFORM | |
| | REFERENCE TYPE (INCLUDING SHARED LOCK) | SAME | PERFORM | |
| | | DIFFERENT | PERFORM | |
| | REFERENCE TYPE (NO LOCK) | SAME | PERFORM | |
| | | DIFFERENT | PERFORM | |

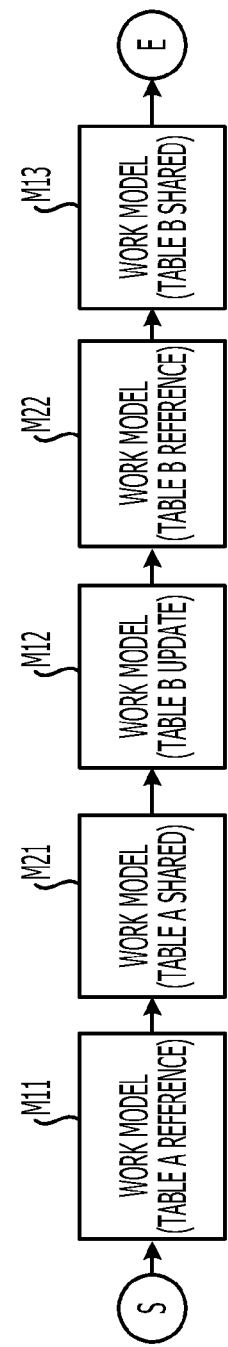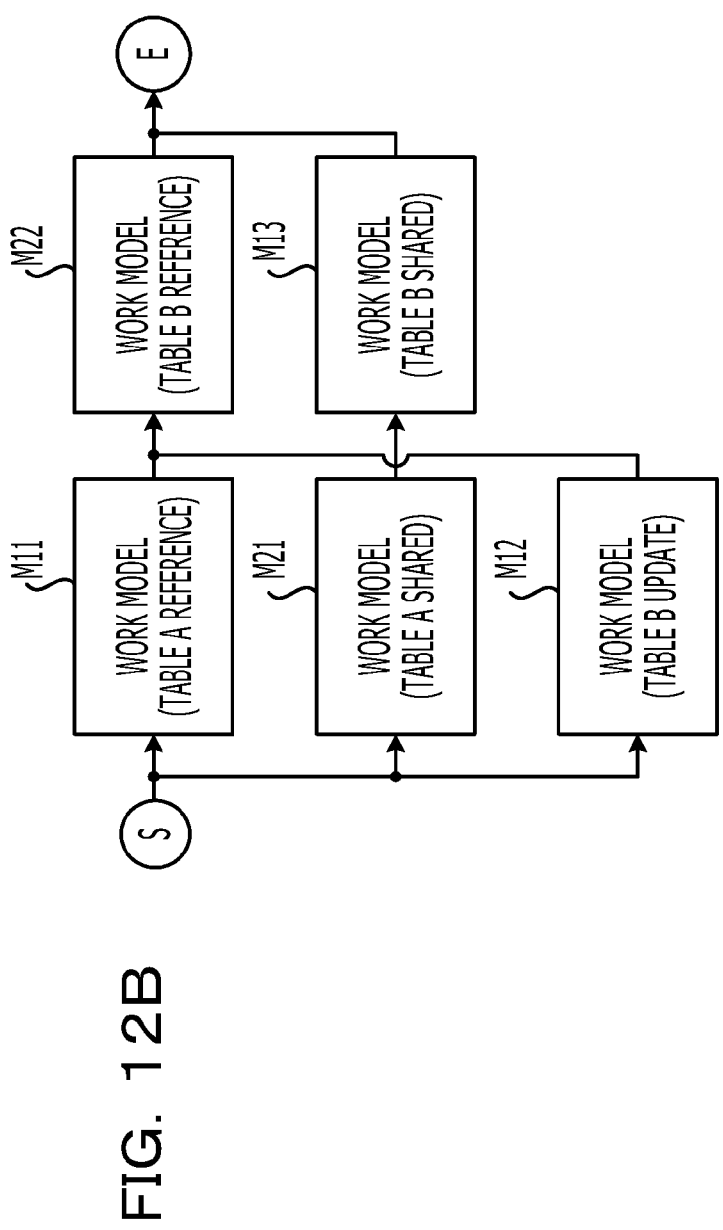
FIG. 12A
FIG. 12B

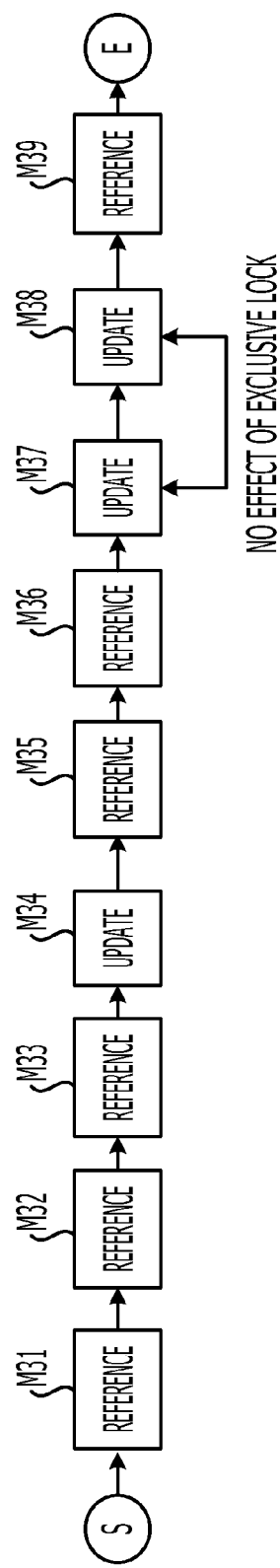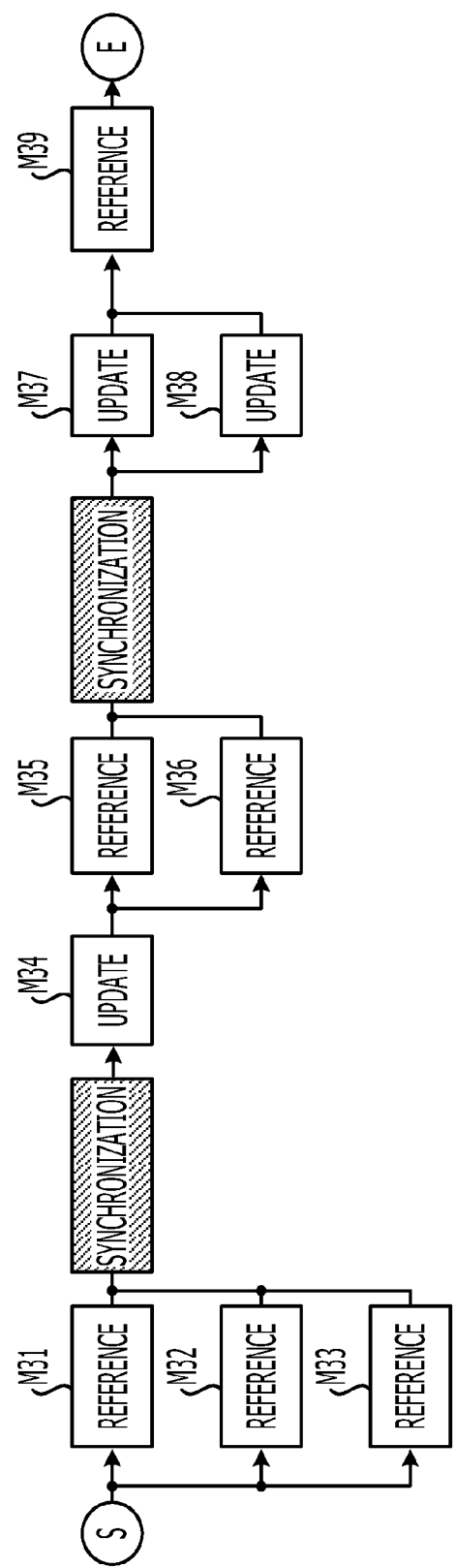

FIG. 18A

| ARRAY (Z) [SCENARIO] | | |
|---|---|---|
| ROW (i) | MODEL | TABLE |
| 1 | M101 UPDATE | A |
| 2 | M102 UPDATE | A |
| 3 | M103 UPDATE | B |
| 4 | M104 SHARED | A |
| 5 | M105 SHARED | B |
| 6 | M106 REFERENCE | A |
| 7 | M107 REFERENCE | B |
| 8 | M108 SHARED | A |
| 9 | M109 UPDATE | A |
| 10 | M110 UPDATE | B |
| 11 | M111 SHARED | A |
| 12 | M112 SHARED | B |
| 13 | M113 REFERENCE | A |
| 14 | M114 REFERENCE | B |
| 15 | M115 REFERENCE | A |
| 16 | M116 UPDATE | A |
| 17 | M117 UPDATE | B |
| 18 | M118 SHARED | A |
| 19 | M119 SHARED | B |
| 20 | M120 REFERENCE | A |
| 21 | M121 REFERENCE | B |

FIG. 18B

| ROW(j) \ COLUMN(k) | 1 | | 2 | | 3 | | 4 | | ... | |
|---|---|---|---|---|---|---|---|---|---|---|
| | MODEL | TABLE | MODEL | TABLE | MODEL | TABLE | MODEL | TABLE | MODEL | TABLE |
| 1 | M101(UPDATE) | A | M103(UPDATE) | B | | | | | | |
| 2 | M102(UPDATE) | A | M105(SHARED) | B | M107(REFERENCE) | B | | | | |
| 3 | M104(SHARED) | A | M106(REFERENCE) | A | M108(SHARED) | A | M110(UPDATE) | B | | |
| 4 | M109(UPDATE) | A | M112(SHARED) | B | M114(REFERENCE) | B | | | | |
| 5 | M111(SHARED) | A | M113(REFERENCE) | A | M115(REFERENCE) | A | M117(UPDATE) | B | | |
| 6 | M116(UPDATE) | A | M119(SHARED) | B | M121(REFERENCE) | B | | | | |
| 7 | M118(SHARED) | A | M120(REFERENCE) | A | | | | | | |
| 8 | | | | | | | | | | |
| 9 | | | | | | | | | | |
| ... | ... | | ... | | ... | | ... | | ... | |

ARRAY (Y) [MULTIPLEXING]

FIG. 18C

| ARRAY (X) [NUMBER OF MODELS IN ROW (j)] ||
|---|---|
| ROW (j) | NUMBER OF MODELS |
| 1 | 2 |
| 2 | 3 |
| 3 | 4 |
| 4 | 3 |
| 5 | 4 |
| 6 | 3 |
| 7 | 2 |
| 8 | 0 |
| 9 | 0 |
| ⋮ | ⋮ |

FIG. 18D

| ARRAY (W) [SYNCHRONIZATION IN ROW (j)] ||
|---|---|
| ROW (j) | SYNCHRONIZATION |
| 1 | 0 (ABSENCE) |
| 2 | 0 (ABSENCE) |
| 3 | 1 (PRESENCE) |
| 4 | 1 (PRESENCE) |
| 5 | 1 (PRESENCE) |
| 6 | 1 (PRESENCE) |
| 7 | 0 (ABSENCE) |
| 8 | 0 (ABSENCE) |
| ⋮ | ⋮ | ed
SCENARIO CREATING APPARATUS, SCENARIO CREATING METHOD, AND STORAGE MEDIUM STORING SCENARIO CREATING PROGRAM

CROSS-REFERENCE TO RELATED APPLICATIONS

This application is based upon and claims the benefit of priority of the prior Japanese Patent Application No. 2009-132957, filed on Jun. 2, 2009, the entire contents of which are incorporated herein by reference.

FIELD

This embodiment relates to a scenario creating apparatus, a scenario creating method, and a storage medium storing a scenario creating program.

BACKGROUND

In a case when a bug is fixed in an information processing system, or when a new function is added to the information processing system, for example, a tester or the like who is in charge of testing the information processing system performs testing to verify that such a fix or added app is not affecting other apps. For this reason, the tester performs similar testing every time the information processing system is modified. Such testing is called "recursion testing" or "regression testing".

Now, an example of a testing technique according to the related art will be described with reference to FIG. 23. In the example illustrated in FIG. 23, an information processing system 9 has a Web server 13, an AP (application) server 14, and a DB (Data Base) server 15. The information processing system 9 is connected with a test terminal 11 via a network 31.

In the example illustrated in FIG. 23, when carrying out testing, a tester H1 performs a predetermined operation on the test terminal 11. For example, the tester H1 opens a Web browser, and inputs information defined in a test specification on the Web browser.

The test terminal 11 transmits an HTTP (HyperText Transfer Protocol) request or the like to the Web server 13, in response to the operation performed by the tester H1. Upon receiving the HTTP request or the like, the Web server 13 transmits/receives a request or a response to/from the AP server 14. In the meantime, the AP server 14 transmits/receivers a request or a response to/from the DB server 15. In the following, a request and a response will be sometimes collectively referred to as "message".

Then, for example, the test terminal 11 receives a response from the Web server 13, and outputs information corresponding to the received response on the Web browser. Then, the tester H1 checks the information outputted on the Web browser to determine pass/fail of testing.

In this way, the tester H1 performs testing on the information processing system 9. When performing recursion testing, the tester H1 performs the same operation as previously performed, and performs the same check as previously performed. While FIG. 23 illustrates a case in which testing is conducted by a single tester, generally, such testing is conducted by a plurality of testers.

Recently, with a view to reducing the number of man-hours required for recursion testing, an automatic testing technique has been proposed which carries out a part of recursion test automatically. Such an automatic testing technique will be described below with reference to the example illustrated in FIG. 23. It is assumed here that the automatic testing technique is applied to the test terminal 11. In such a case, the test terminal 11 generates, for example, information containing an operation procedure performed by the tester H1, and a response received from the Web server 13 (hereinafter, referred to as "test data").

Then, when performing recursion testing, for example, the tester H1 does a read operation that reads the test data after initializing various kinds of database held on the DB sever 15. When the read operation is performed, the test terminal 11 executes the operation procedure contained in the test data, and transmits a request to the Web server 13. Then, the test terminal 11 receives a response from the Web server 13, and determines pass/fail of the testing by determining whether or not the received response matches the response contained in the test data. In this way, by using the automatic testing technique, the tester H1 performs recursion testing without performing a predetermined operation procedure.

For instance, Japanese Laid-open Patent Publication No. 11-184900 and Japanese Laid-open Patent Publication No. 2007-264810 are known as in relation to the automatic testing technique.

SUMMARY

According to an aspect of the invention, a scenario creating apparatus, which creates a scenario for verifying operation of an information processing system in which a plurality of servers including a database server are connected, includes a collector that collects messages transmitted and received between the plurality of servers, when operation of the information processing system is being verified by a terminal apparatus that performs verification of operation; an association unit that associates the collected messages with each other; a sorter that sorts work models in ascending order of time at which access is made to the database server, the work models each being a group of the associated messages; and a scenario creating unit that creates the scenario on the basis of the sorted work models.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 4 depicts an example of messages collected by a collector;

FIG. 5 depicts an example of association performed by an association unit;

FIG. 7B depicts an exclusive control at the time of referencing with a shared lock;

FIG. 9 depicts conditions upon which work models are swapped by a swapper;

FIG. 10A depicts an example of work models that have been sorted by a sorter;

FIG. 10B depicts an example of work models that have been swapped by a swapper;

FIG. 11 depicts conditions upon which work models are multiplexed by a multiplexer;

FIG. 12A depicts an example of work models that have been swapped by a swapper;

FIG. 12B depicts an example of work models that have been multiplexed by a multiplexer;

FIG. 12C depicts an example of work models that have been swapped by a swapper;

FIG. 12D depicts conditions upon which work models that have been multiplexed and assigned synchronization information by a multiplexer;

FIG. 18A depicts an example of work models to be multiplexed by a multiplexer;

FIG. 18B depicts an example of array Y(j, k) used in multiplexing performed by a multiplexer;

FIG. 18C depicts an example of array X(j) used in multiplexing performed by a multiplexer;

FIG. 18D depicts an example of array W(j) used in multiplexing performed by a multiplexer;

DESCRIPTION OF EMBODIMENTS

Figure 1:
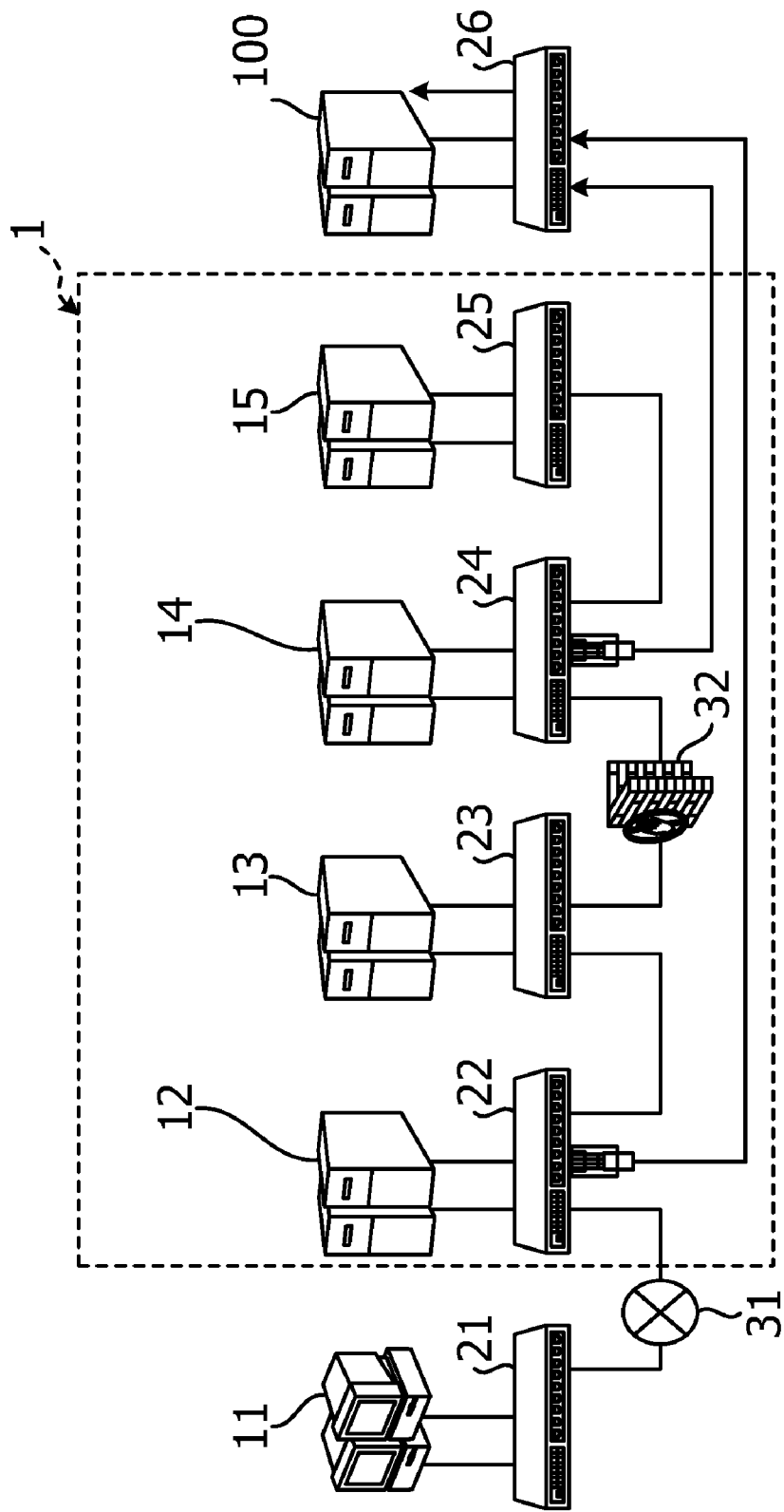
FIG. 1 depicts an exemplary configuration of an information processing system according to Embodiment 1.

Reference may now be made in detail to embodiments of the present invention, examples of which are illustrated in the accompanying drawings, wherein like reference numerals refer to like elements throughout.

Figure 24:
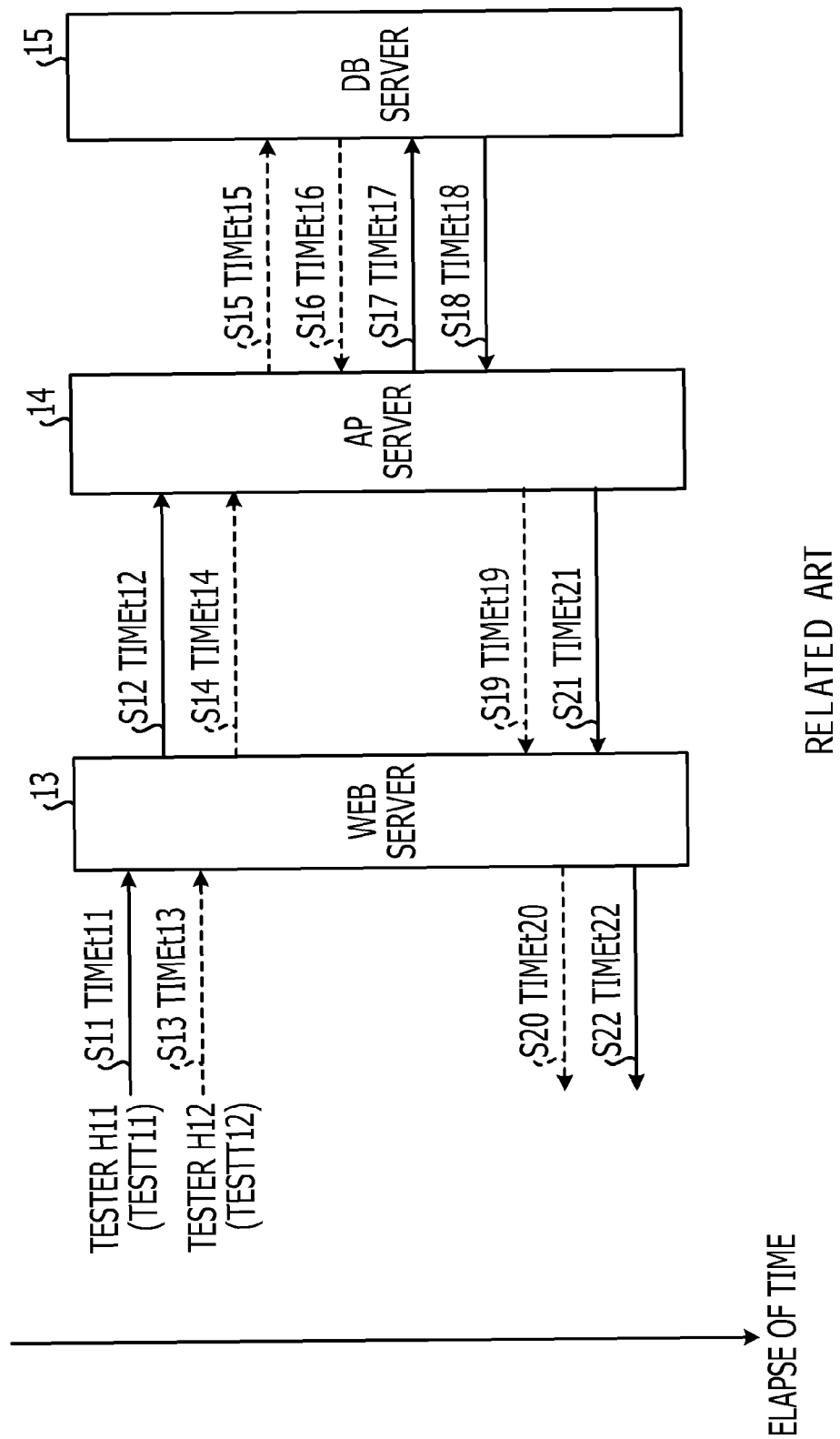
FIG. 24 depicts problems with a testing technique according to the related art.

The above-described automatic testing technique has a problem in that pass/fail of testing cannot be determined correctly in some cases. A specific description in this regard will be given with reference to FIG. 24. FIG. 24 illustrates a case in which testing is conducted by two testers H11 and H12. It should be noted that in FIG. 24, solid arrows indicate messages transmitted/received between servers when testing is performed by the tester H11, and broken arrows indicate messages transmitted/received between servers when testing is performed by the tester H12.

Specifically, in the example illustrated in FIG. 24, when a test T11 is performed by the tester H11, the test terminal transmits a request to the Web server 13 at time t11 (operation S11). Thereafter, the Web server 13 transmits a request to the AP server 14 at time t12 (operation S12), and the AP server 14 transmits a request to the DB server 15 at time t17 (operation S17). Then, the DB server 15 responds to the request received from the AP server 14 and references or updates a database, and transmits the reference result or update result to the AP server 14. In the example illustrated in FIG. 24, the DB server 15 transmits a response containing the reference result or update result to the AP server 14 at time t18 (operation S18). Then, the AP server 14 transmits a response to the Web server 13 at time t21 (operation S21), and the Web server 13 transmits a response to the test terminal at time t22 (operation S22).

In addition, in the example illustrated in FIG. 24, when a test T12 is carried out by the tester H12, the test terminal transmits a request to the Web server 13 at time t13 (operation S13). Thereafter, the Web server 13 transmits a request to the AP server 14 at time t14 (operation S14), and the AP server 14 transmits a request to the DB server 15 at time t15 (operation S15). Then, the DB server 15 transmits a response to the AP server 14 at time t16 (operation S16), and the AP server 14 transmits a response to the Web server 13 at time t19 (operation S19). Thereafter, the Web server 13 transmits a response to the test terminal at time t20 (operation S20).

In the example illustrated in FIG. 24, if the automatic testing technique according to the related art described above is applied to the test terminal, the test terminal generates test data D11 corresponding to the test T11, and test data D12 corresponding to the test T12. At this time, when performing recursion testing by using the test data D11, the tester returns the state of the DB server 15 to the state before the tests T11 and T12 were carried out.

Here, as illustrated in FIG. 24, in the test T11, access to the DB server 15 is made after access is made to the DB server 15 in the test T12. At this time, there is a possibility that data on the DB server 15 is updated by the test T12. That is, there is a possibility that a table that has been updated in the test T12 is accessed in the test T11. For this reason, if the DB server 15 is updated in the test T12, it is required in the test T11 to make access to the DB server 15 that has been updated.

However, when the test T11 is executed using the test data D11, access cannot be made to the DB server 15 that has been updated in the test T12. Thus, there is a fear that the test terminal may receive from the Web server 13 a response different from a response contained in the test data D11. This causes a problem in which pass/fail of the testing cannot be determined correctly even though the information processing system is operating properly.

It is perceived that the operations of the respective servers illustrated in FIG. 24 can be replicated by executing the tests T11 and T12 in the same order as that at the time of generating the test data D11 and D12. However, since the order in which messages are transmitted/received between the servers varies with the conditions of the server or the conditions of the network, the operations of the servers cannot always be replicated. For this reason, in some cases, pass/fail of testing cannot be determined correctly even when the testing is executed in the same order as that at the time of generating test data.

As described above, since recursion testing is frequency performed in the field of information processing systems, the number of man-hours required for such recursion testing has been increasing. Under such a circumstance, the challenge is how to create test data that allows pass/fail of the testing to be determined correctly.

Hereinbelow, scenario creating apparatus, scenario creating method, and storage medium storing scenario creating program disclosed by this application will be described in detail with reference to the drawings. It should be noted that this embodiment does not limit the scenario creating apparatus, scenario creating method, and storage medium storing scenario creating program.

Embodiment 1

Configuration of Information Processing System According to Embodiment 1

First, referring to FIG. 1, a description will be given of the configuration of an information processing system 1 including a scenario creating apparatus 100 according to Embodiment 1. FIG. 1 depicts an exemplary configuration of the information processing system 1 according to Embodiment 1. In the example illustrated in FIG. 1, the information processing system 1 has a load distribution apparatus 12, a plurality of Web servers 13, an AP server 14, and a DB sever 15.

As illustrated in FIG. 1, the load distribution apparatus 12, the Web servers 13, the AP server 14, and the DB server 15 are respectively connected via routers 22 to 25. In addition, in the example illustrated in FIG. 1, a firewall 32 is installed between the Web servers 13 and the AP server 14. In addition, in the example illustrated in FIG. 1, the test terminal 11 is connected to the load distribution apparatus 12 via a router 21 and a network 31. In addition, in the example illustrated in FIG. 1, the scenario creating apparatus 100 is connected to the AP server 14 and the load distribution apparatus 12.

The test terminal 11 is a terminal apparatus such as a personal computer operated by a tester. The load distribution apparatus 12 receives a request from the test terminal 11, and transfers the received request to the Web servers 13. For example, the load distribution apparatus 12 transfers a request in such a way that loads on the plurality of Web servers 13 become uniform. In response to the request from the test terminal 11, the Web servers 13 each transmit a response containing HTML (HyperText Markup Language) data, image data, and the like to the test terminal 11.

The AP server 14 has applications for implementing various kinds of service provided by the information processing system 1. In the example illustrated in FIG. 1, the AP server 14 receives a request from the Web servers 13, and performs various kinds of processing in accordance with the received request. Specifically, by transmitting a request to the DB server 15, the AP server 14 acquires various kinds of data from the DB server 15, or updates various kinds of data held on the DB server 15.

The DB server 15 stores various kinds of information. In the example illustrated in FIG. 1, the DB server 15 receives a request for access to a database from the AP server 14, and controls access to the database. Specifically, in accordance with a request received from the AP server 14, the DB server 15 references or updates the database, and transmits a response containing the reference result or update result to the AP server 14.

Under such configuration, when testing is carried out by the tester on the information processing system 1, the scenario creating apparatus 100 according to Embodiment 1 creates a test scenario for replicating such testing.

Specifically, when testing is carried out by the tester on the information processing system 1, the scenario creating apparatus 100 collects various kinds of message transmitted/received by the test terminal 11 and between the individual servers. In the example illustrated in FIG. 1, the scenario creating apparatus 100 collects messages transmitted/received between the test terminal 11 and the load distribution apparatus 12, and messages transmitted/received between the load distribution apparatus 12 and the Web servers 13, by using a port monitoring (also expressed as capture in some cases) function from a router 22 to which the load distribution apparatus 12 is connected. In addition, the scenario creating apparatus 100 collects messages transmitted/received between the Web servers 13 and the AP server 14, and messages transmitted/received between the AP server 14 and the DB server 15, by using a port monitoring function from a router 24 to which the AP server 14 is connected.

Subsequently, the scenario creating apparatus 100 stores, among the collected messages, related messages in association with each other. The expression "related messages" as used herein refers to requests and responses transmitted/received between individual servers in response to predetermined requests and responses.

For example, in a case when a request Req1 is transmitted from the load distribution apparatus 12 to the Web servers 13, and a request Req2 is transmitted from the Web servers 13 to the AP server 14 in response to the request Req1, the requests Req1 and Reg2 are related. Also, suppose that a request Req3 is transmitted from the AP server 14 to the DB server 15 in response to the request Req2, and a response Res1 is transmitted from the DB server 15 to the AP server 14 in response to the request Req3. In such a case, the requests Req1, Req2, and Req3, and the response Res1 are related.

It should be noted that in the following, the process from when a request is transmitted from the test terminal 11 to the load distribution apparatus 12 to when a response is transmitted from the load distribution apparatus 12 to the test terminal 11 in response to the request will be referred to as "transaction". Also, in the following, each group of messages within the same transaction which are associated with each other by the scenario creating apparatus 100 will be referred to as "work model".

Subsequently, the scenario creating apparatus 100 sorts generated work models in ascending order of the time when access to the DB server 15 is started. Then, the scenario creating apparatus 100 generates a scenario on the basis of the sorted work models.

Referring to the example illustrated in FIG. 24, when the test T11 is carried out, the scenario creating apparatus 100 collects messages transmitted/received in operations S11, S12, S17, S18, S21, and S22. Then, the scenario creating apparatus 100 generates a work model M1 by associating the collected messages with each other. In addition, when the test T12 is carried out, the scenario creating apparatus 100 collects messages transmitted/received in operations S13, S14, S15, S16, S19, and S20, thereby generating a work model M2.

Then, since the test T12 makes access to the DB server 15 earlier than the test T11, the scenario creating apparatus 100 sorts the work models in the order of the work model M2 and the work model M1. Then, the scenario creating apparatus 100 creates a scenario on the basis of the sorted work models M2 and M1.

The scenario created in this way serves as test data for carrying out testing in the order of the test T12 and the test T11. Specifically, when the above-mentioned scenario is executed by the test terminal 11, first, the work model M2 is executed, and then the work model M1 is executed. That is, the work model M1 makes access to the DB server 15 after access to the DB server 15 is made by the work model M2. Therefore, upon executing the above-mentioned scenario when the information processing system 1 is operating properly, the test terminal 11 can receive the same responses as the responses received when the tests T11 and T12 are performed. Therefore, the test terminal 11 can correctly perform test pass/fail determination by using the scenario generated by the scenario creating apparatus 100.

In this way, the scenario creating apparatus 100 according to Embodiment 1 collects messages transmitted/received between individual servers, and associate messages transmitted/received within the same transactions with each other to generate work models. Then, the scenario creating apparatus 100 sorts the generated work models in ascending order of the time when access to the DB server 15 is started, thereby creating a scenario.

That is, the scenario creating apparatus 100 generates a scenario in such a way that the order of access to the DB server 15 when testing is carried out by the tester, and the order of access to the DB server 15 at the time when the scenario is executed become the same. Thus, the scenario generated by the scenario creating apparatus 100 makes it possible to determine pass/fail of testing correctly.

It should be noted that the scenario creating apparatus 100 according to Embodiment 1 also performs various kinds of processing other than those described above. For example, after sorting work models, the scenario creating apparatus 100 creates a scenario by multiplexing those work models which do not cause any problem even when carried out in parallel. By way of example, in the example illustrated in FIG. 24, if a table in the database accessed in the test T11 and a table in the database accessed in the test T12 are different, there is no problem in carrying out the test T11 and the test T12 in parallel. In such a case, the scenario creating apparatus 100 creates a scenario by multiplexing the work model corresponding to the test T11, and the work model corresponding to the test T12. Hereinbelow, the configuration of the scenario creating apparatus 100 will be described, and also various kinds of processing including such multiplexing will be specifically described.

Configuration of Scenario Creating Apparatus According to Embodiment 1

Figure 2:
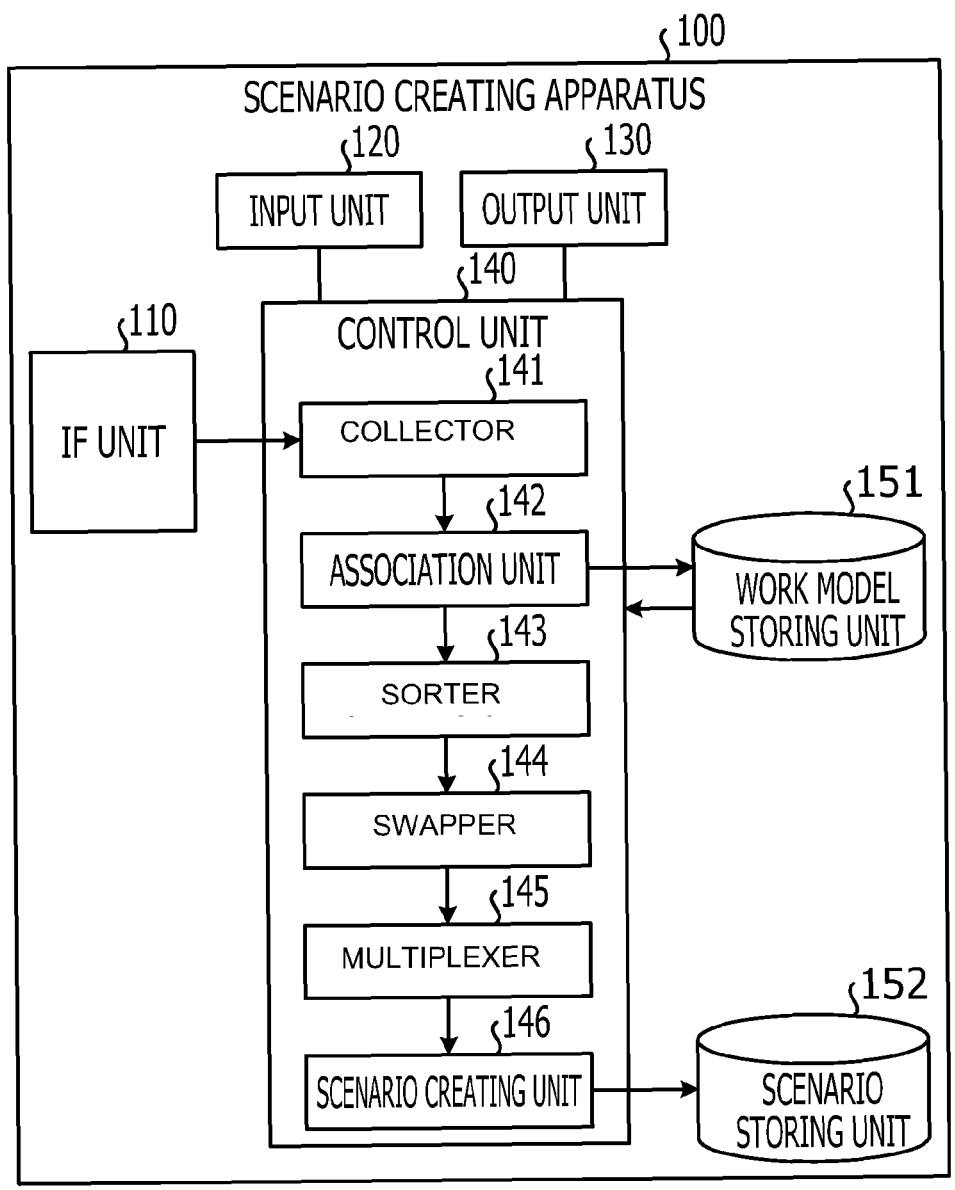
FIG. 2 depicts an exemplary configuration of a scenario creating apparatus according to Embodiment 1.

Next, referring to FIG. 2, the configuration of the scenario creating apparatus 100 according to Embodiment 1 will be described. FIG. 2 depicts an exemplary configuration of the scenario creating apparatus 100 according to Embodiment 1. In the example illustrated in FIG. 2, the scenario creating apparatus 100 has an interface (hereinafter, referred to as "IF") unit 110, an input unit 120, an output unit 130, a control unit 140, a work model storing unit 151, and a scenario storing unit 152.

The IF unit 110 transmits/receives various kinds of data to/from an external apparatus. In the example illustrated in FIG. 1, the IF unit 110 of the scenario creating apparatus 100 receives messages transmitted/received between individual serves, by using a port monitoring function from the router 22 to which the load distribution apparatus 12 is connected and from the router 24 to which the AP server 14 is connected.

The input unit 120 is an input device for inputting various kinds of information and operational instructions, and is, for example, a keyboard or a mouse. The tester performs testing by operating the input unit 120. The output unit 130 is an output device for outputting various kinds of information, and is, for example, a liquid crystal panel or a speaker. The tester determines pass/fail of testing by checking information displayed on the output unit 130, for example.

The control unit 140 has an internal memory for storing a control program, programs specifying various kinds of procedure and the like, and necessary data, and controls the scenario creating apparatus 100 as a whole. As in the example illustrated in FIG. 2, the control unit 140 according to Embodiment 1 has a collector 141, an association unit 142, a sorter 143, a swapper 144, a multiplexer 145, and a scenario creating unit 146.

The collector 141 collects messages transmitted/received between individual servers when the operation of the information processing system 1 is being verified by the tester. Specifically, the collector 141 collects various kinds of message transmitted/received between the load distribution apparatus 12 and servers such as the Web servers 13 when a request is transmitted by the test terminal 11 to the load distribution apparatus 12, via the IF unit 110.

Figure 3:
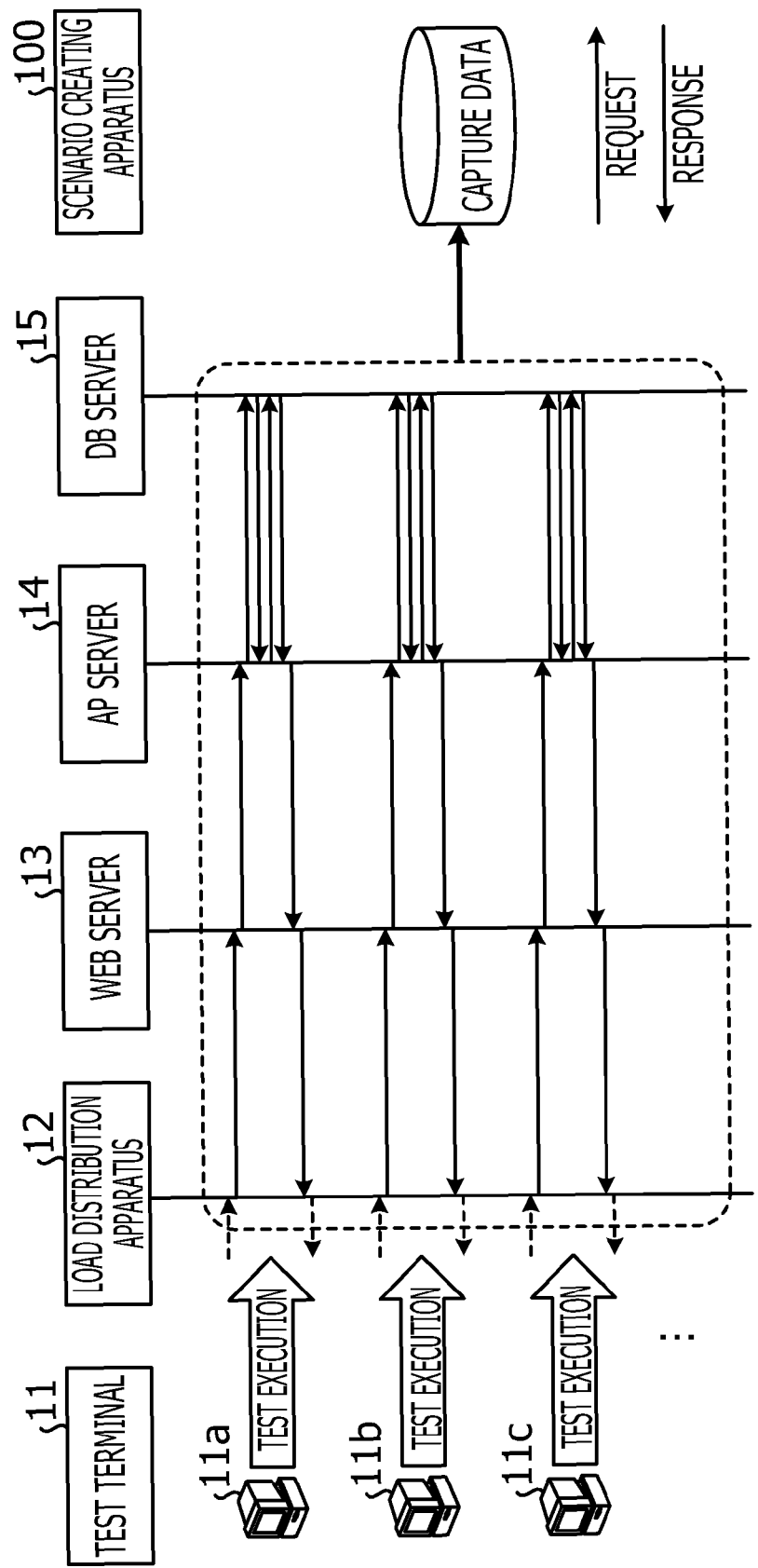
FIG. 3 depicts an example of message collection performed by a collector.

Referring to FIG. 3, message collection performed by the collector 141 will be described. FIG. 3 depicts an example of message collection performed by the collector 141. In the example illustrated in FIG. 3, testing is performed by using test terminals 11a to 11c. As illustrated in FIG. 3, when testing is being performed by using the test terminals 11a to 11c, requests are transmitted from the test terminals 11a to 11c to the load distribution apparatus 12. Thus, requests and responses are transmitted/received between the load distribution apparatus 12 and the Web servers 13, between the Web servers 13 and the AP server 14, and between the AP server 14 and the DB server 15. The collector 141 collects requests and responses transmitted/received between the servers, and retains the requests and responses as capture data.

Now, referring to FIG. 4, messages collected by the collector 141 will be described. FIG. 4 depicts an example of messages collected by the collector 141. As in the example illustrated in FIG. 4, the collector 141 collects, as requests to be transmitted from the load distribution apparatus 12 to the Web servers 13, for example, an HTTP request, the time (time stamp) at which the HTTP request is transmitted, and the like. In addition, as responses to be transmitted from the Web servers 13 to the load distribution apparatus 12, the collector 141 collects, for example, an HTTP response, a time stamp of when the HTTP response is transmitted, an HTTP status code, and the like.

As illustrated in FIG. 4, the collector 141 collects, as requests to be transmitted from the Web servers 13 to the AP server 14, for example, a message containing information for identifying an application, a time stamp, and the like. Also, the collector 141 collects, as responses to be transmitted from the AP server 14 to the Web servers 13, for example, a return value, a time stamp, and the like.

As illustrated in FIG. 4, the collector 141 collects, as requests to be transmitted from the AP server 14 to the DB server 15, for example, an SQL statement, a control statement, a time stamp, and the like. Also, the collector 141 collects, as responses to be transmitted from the DB server 15 to the AP server 14, for example, an SQL execution result, a return value, a time stamp, and the like.

Returning to the explanation of FIG. 2, among messages collected by the collector 141, the association unit 142 associates messages transmitted/received within the same transactions with each other, thereby generating work models. The association unit 142 assigns each generated work model with an attribute for identifying the mode of processing performed on the DB server 15. Then, the association unit 142 stores the work model assigned with the attribute into the work model storing unit 151.

Figure 6:
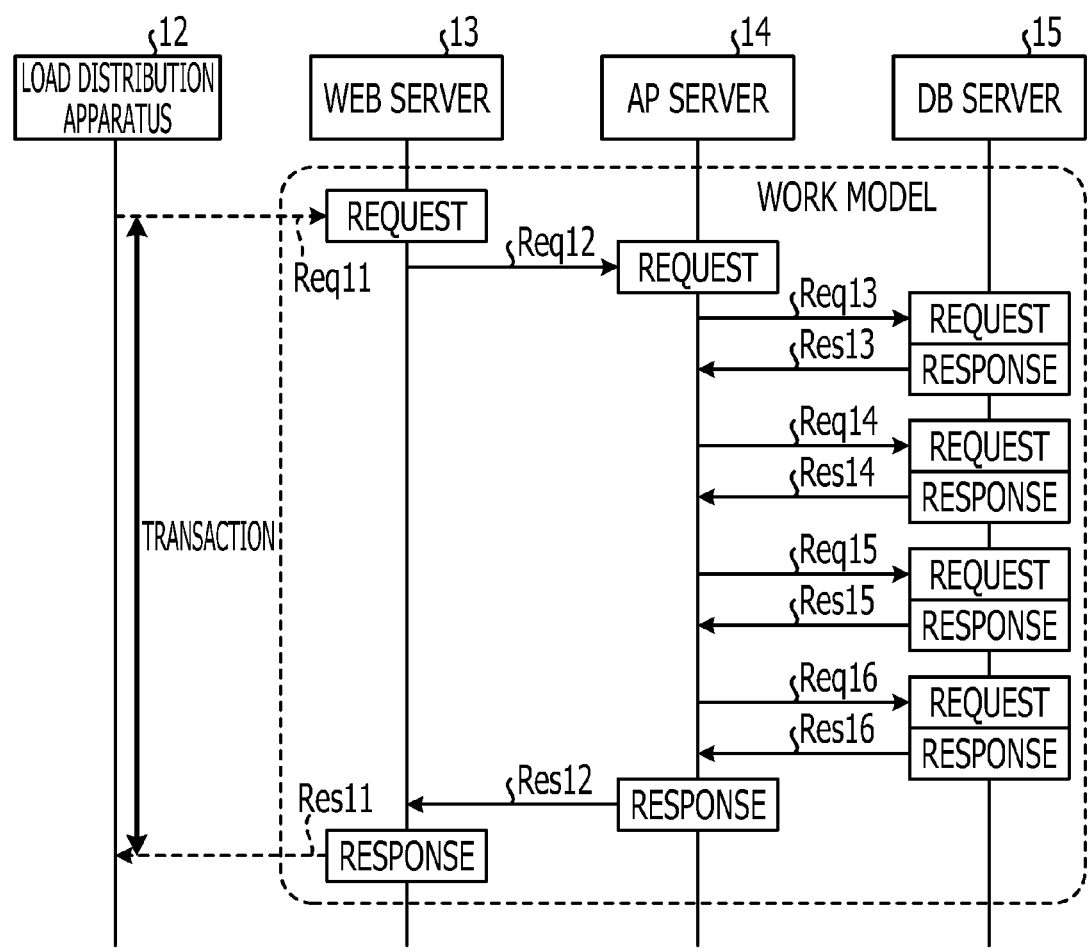
FIG. 6 depicts an example of association performed by an association unit.

Referring to FIGS. 5 and 6, an association performed by the association unit 142 will be described. FIGS. 5 and 6 depict an example of association performed by the association unit 142. It is assumed that the messages illustrated in FIG. 5 are to be transmitted/received within the same transaction. In such a case, the association unit 142 associates messages transmitted/received between the load distribution apparatus 12 and the Web servers 13, messages transmitted/received between the Web servers 13 and the AP server 14, and messages transmitted/received between the AP server 14 and the DB server 15 with each other.

In the example illustrated in FIG. 6, the test terminal 11 transmits a request Req11 to the Web servers 13 via the load distribution apparatus 12. Also, the Web servers 13 each transmit a response Res11 to the test terminal 11 via the load distribution apparatus 12. In the example illustrated in FIG. 6, the process from when the request Req11 is transmitted from the test terminal 11 to when the response Res11 is transmitted to the test terminal 11 represents a single transaction.

In such a case, the association unit 142 generates a work model by associating the requests Req11 to Req16 and the responses Res11 to Res16 illustrated in FIG. 6 with each other. Then, the association unit 142 assigns the generated work model with an attribute, and stores the resulting work model into the work model storing unit 151.

Now, a supplemental description will be given of an attribute assigned to each work model. In Embodiment 1, the association unit 142 assigns an attribute "update type" to a work model which performs updating to the DB server 15. Also, the association unit 142 assigns an attribute "reference type (shared)" to a work model which does not perform updating to the DB server 15 and performs referencing with a shared lock. Also, the association unit 142 assigns an attribute "reference type (no lock)" to a work model which performs only referencing with no shared lock to the DB server 15.

For example, if updating and referencing are performed in the work model M3, the association unit 142 assigns the work model M3 with an attribute "update type". If, for example, referencing with a shared lock and referencing with no shared lock are performed in the work model M4, the association unit 142 assigns the work model M4 with an attribute "reference type (shared lock)". If, for example, only referencing with no shared lock is performed in the work model M5, the association unit 142 assigns the work model M5 with an attribute "reference type (no lock)".

Figure 7A:
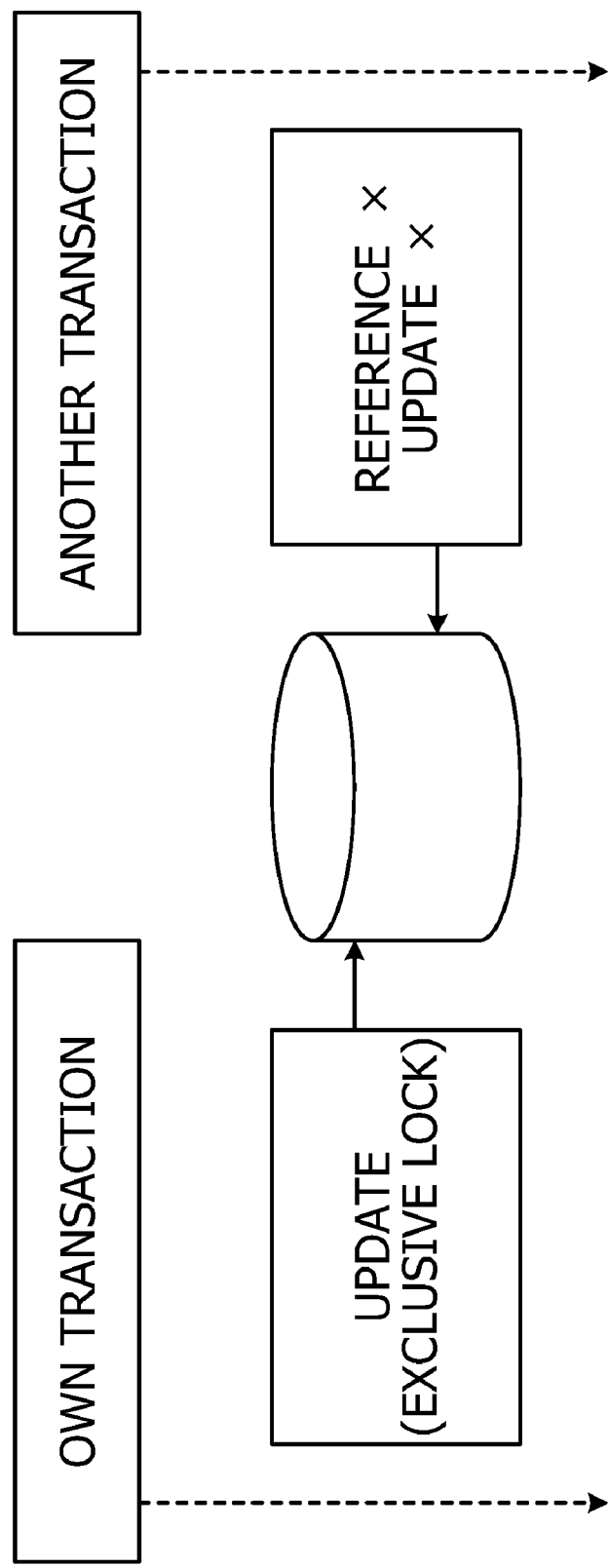
FIG. 7A depicts an exclusive control at the time of updating.
Figure 7C:
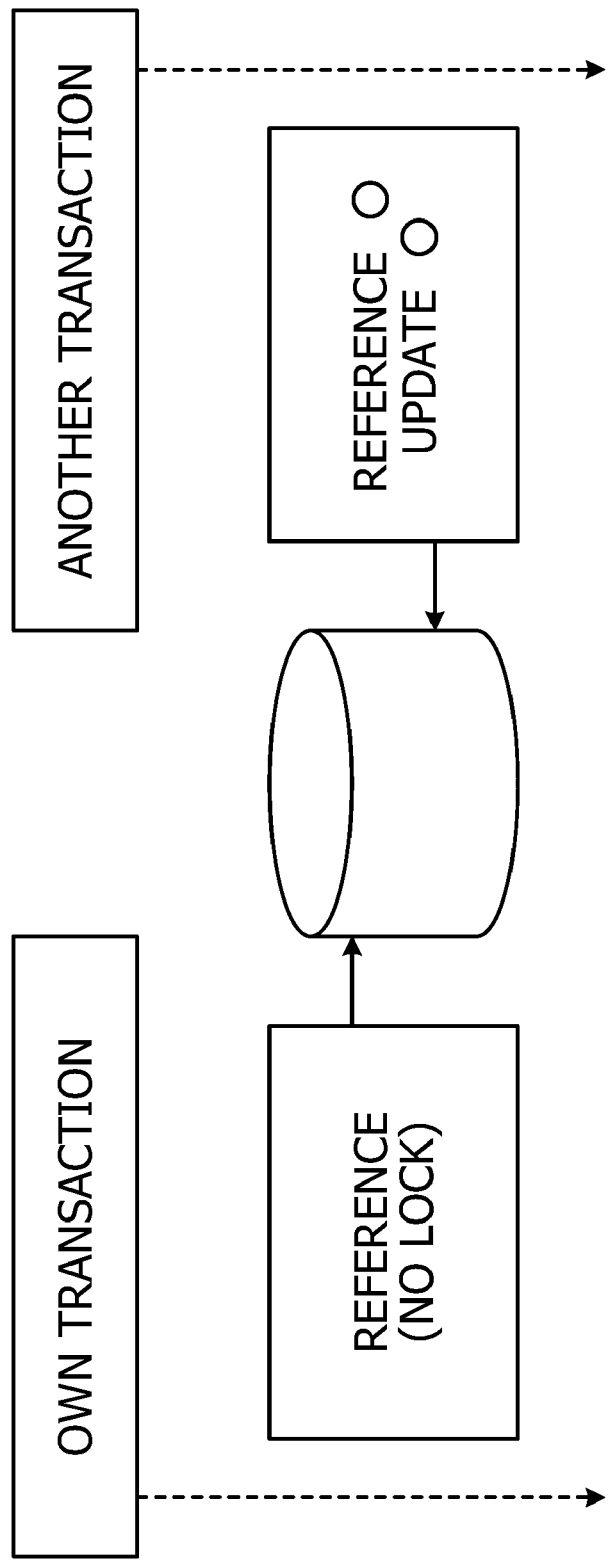
FIG. 7C depicts an exclusive control at the time of referencing with no shared lock.

Referring to FIGS. 7A to 7C, a brief description will be given of "update type", "reference type (shared lock)", and "reference type (no lock)" mentioned above. FIG. 7A depicts an exclusive control at the time of updating. FIG. 7B depicts an exclusive control at the time of referencing with a shared lock. FIG. 7C depicts an exclusive control at the time of referencing with no shared lock.

As illustrated in FIG. 7A, when performing updating to a table, an arbitrary transaction acquires an exclusive lock. According to Embodiment 1, when an exclusive lock is acquired by an arbitrary transaction, other transactions cannot perform referencing and updating to the same table.

As illustrated in FIG. 7B, when perform referencing to a table, an arbitrary transaction can acquire a shared lock. According to Embodiment 1, when a shared lock is acquired by an arbitrary transaction, other transactions can perform referencing but cannot perform updating.

As illustrated in FIG. 7C, it is also possible for an arbitrary transaction not to acquire a lock when perform referencing to a table. According to Embodiment 1, when a reference is being performed by an arbitrary transaction without acquiring a lock, other transactions can perform referencing and updating to the same table.

Returning to the explanation of FIG. 2, the sorter 143 sorts work models generated by the association unit 142 in ascending order of the start time of access to the DB server 15. Specifically, the sorter 143 acquires work models from the work model storing unit 151, and merges the acquired work models. Then, the sorter 143 sorts the merged work models in ascending order of the start time of access to the DB server 15.

Figure 8A:
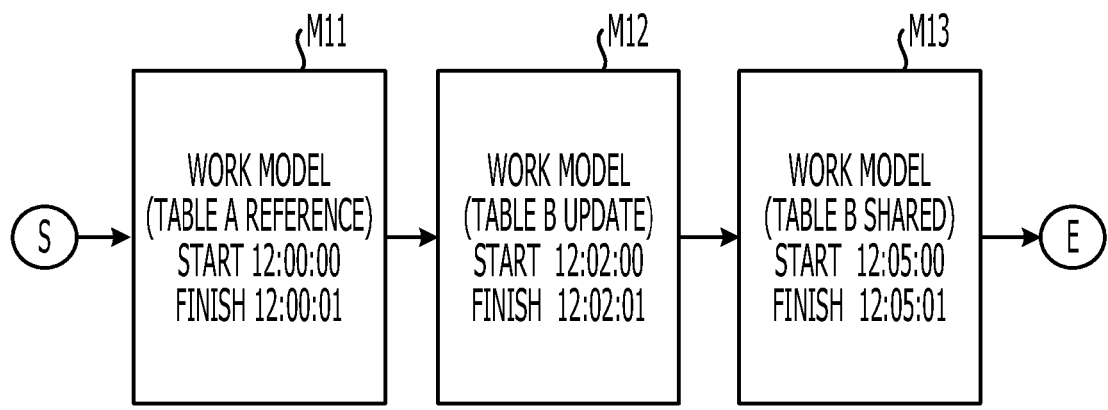
FIG. 8A depicts three work models M11 to M13.
Figure 8B:
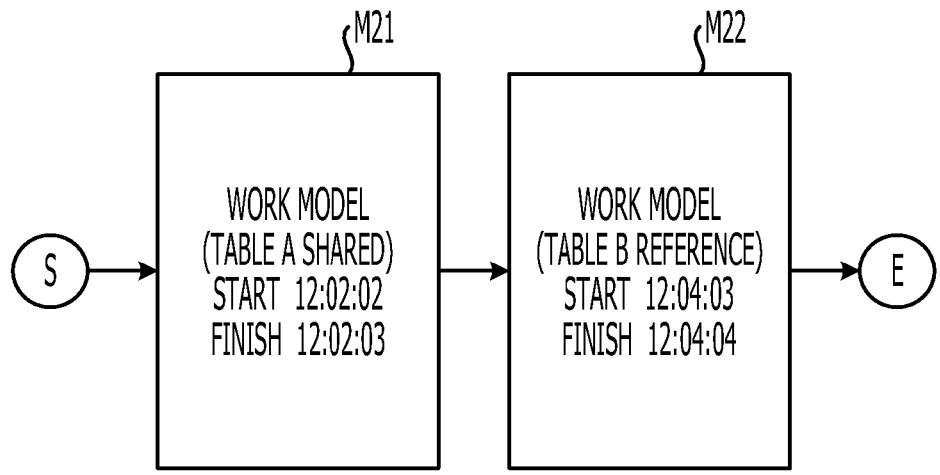
FIG. 8B depicts two work models M21 and M22.
Figure 8C:
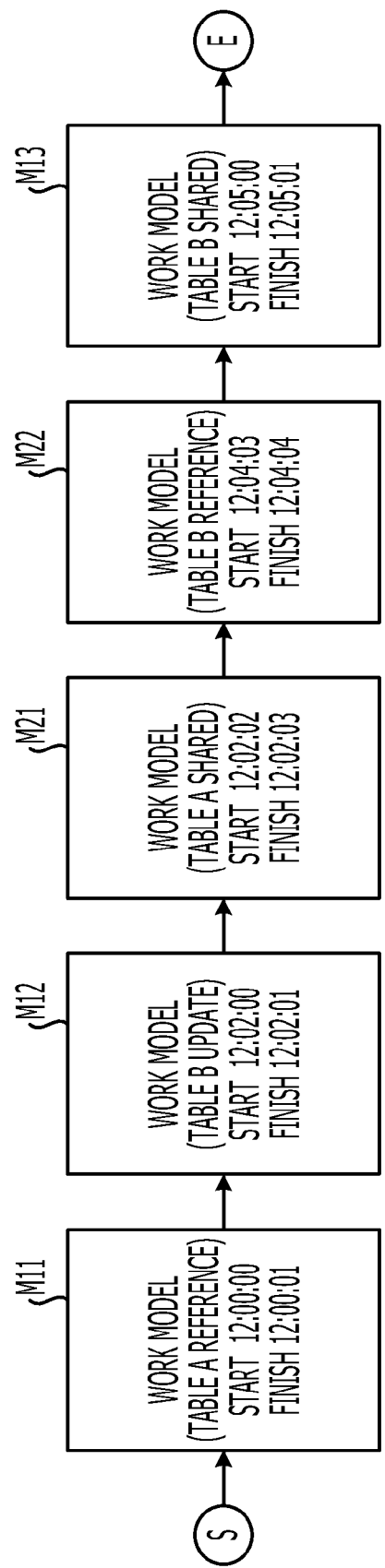
FIG. 8C depicts an example of work models that have been sorted by a sorter.

Referring to FIGS. 8A to 8C, a description will be given of sorting performed by the sorter 14. FIG. 8A depicts three work models M11 to M13. This illustrates a case in which three transactions are generated in a single test. FIG. 8B depicts two work models M21 and M22. This illustrates a case in which two transactions are generated in a single test.

It should be noted that in the examples illustrated in FIGS. 8A and 8B, "(Table X update)" illustrated inside each rectangle representing a work model indicates that updating is performed to Table X in the work model. Also, "(Table X shared)" illustrated inside each rectangle representing a work model indicates that referencing with a shared lock is performed to Table X in the work model. Also, "(Table X reference)" illustrated inside each rectangle representing a work model indicates that referencing with no shared lock is performed to Table X in the work model. Also, numerical values illustrated in the portion after "start" illustrated inside each rectangle representing a work model indicates the time at which access to the DB server 15 is started, and numerical values illustrated in the portion after "finish" indicates the time at which access to the DB server 15 is finished.

That is, the work model M11 illustrated in FIG. 8A indicates that a reference is performed to Table A, access to the DB server 15 is started at "12 h 00 m 00 s", and access to the DB server 15 is finished at "12 h 00 m 01 s". The work model M12 illustrated in FIG. 8A indicates that updating is performed to Table B, access to the DB server 15 is started at "12 h 02 m 00 s", and access to the DB server 15 is finished at "12 h 02 m 01 s".

Now, suppose that the work models M11 to M13, M21, and M22 illustrated in FIGS. 8A and 8B are stored in the work model storing unit 151. In such a case, as illustrated in the example illustrated in FIG. 8C, the sorter 143 merges the work models M11 to M13, M21, and M22 acquired from the work model storing unit 151, and then sorts the work models in the order of the work models M11, M12, M21, M22, and M13. Thus, the work models M11, M12, M21, M22, and M13 are rearranged in ascending order of the start time of access to the DB server 15.

Returning to the explanation of FIG. 2, in order for multiplexing to be efficiently performed by the multiplexer 145 described later, the swapper 144 swaps the order of the work models sorted by the sorter 143 so that work models with the same attribute become adjacent to each other. Specifically, the swapper 144 makes reference-type work models adjacent to each other, and makes update-type work models adjacent to each other. At this time, if, after an update-type work model, a reference-type work model that references a table updated by such an update-type work model is placed, the swapper 144 does not swap the order of the update-type work model and the reference-type work model.

In Embodiment 1, by using a bubble sort, the swapper 144 swaps the order of work models while comparing each two adjacent work models. Specifically, the swapper 144 performs swapping beginning with the work model whose access start time is closest to the current time. For example, when performing swapping with respect to the work models illustrated in FIG. 8C, first, the swapper 144 compares the work model M13 placed at the rear end with the work model M22 placed second from the rear end. Subsequently, the swapper 144 compares the work models placed second and third from the rear end with each other, and then compares the work models placed third and fourth from the rear end with each other.

FIG. 9 depicts conditions upon which work models are swapped by the swapper 144. The example illustrated in FIG. 9 indicates such a condition that a reference-type work model be placed before an update-type work model. In the example illustrated in FIG. 9, the "Current work model" indicates, of two work models to be compared, the work model located in rear of the other, and the "immediately preceding work model" indicates, of two work models to be compared, the work model located in front of the other. In other words, the "current work model" indicates, of two work models to be compared, the work model closer to the current time. Also, in the example illustrated in FIG. 9, the "tables to be referenced/updated" indicates whether or not the tables referenced or updated in the "current work model" and the "immediately preceding work model" are the same.

For example, as illustrated in FIG. 9, if the attribute of the current work model is "update type", the swapper 144 does not swap the work models to be compared, irrespective of the attribute of the immediately preceding work model. This is because, as described above, the example illustrated in FIG. 9 indicates a condition that a reference-type work model be placed before an update-type work model.

Also, for example, as illustrated in FIG. 9, if the attribute of the current work model is "reference type", and the attribute of the immediately preceding work model is "update type", the swapper 144 determines whether or not the "tables to be referenced/updated" by the two work models are the same. Then, if the tables to be updated by the two work models are the same, the swapper 144 does not swap the two work models.

This is because if works models that access the same table are arranged in the order of "update type and reference type", it is required that the two work models be processed in that order. For example, if a work model M7 that performs referencing to Table A is placed after a work model M6 that performs updating to Table A, it is required that the work model M7 be executed after Table A is updated by the work model M6. Therefore, in the case of the above-mentioned example, the swapper 144 does not swap the order of the work models M6 and M7.

On the other hand, if the "tables to be referenced/updated" by the two work models are different in the above-mentioned example, the swapper 144 swaps the two work models. This is because, as described above, the swapper 144 according to Embodiment 1 places a reference-type work model before an update-type work model.

Now, referring to FIGS. 10A and 10B, swapping performed by the swapper 144 will be described. FIGS. 10A and 10B depict an example of swapping performed by the swapper 144. FIG. 10A depicts an example of work models sorted by the sorter 143. It should be noted that the work models illustrated in FIG. 10A are the same as the work models illustrated in FIG. 8C. The swapper 144 swaps the work models illustrated in FIG. 10A in accordance with the conditions illustrated in FIG. 9. Specifically, as illustrated in FIG. 10B, the swapper 144 swaps the work models in the order of the work models M11, M21, M12, M22, and M13. In this way, the swapper 144 swaps the order of the work models sorted by the sorter 143, in accordance with the conditions illustrated in FIG. 9.

Returning to the explanation of FIG. 9, the multiplexer 145 multiples the work models that have been swapped by the swapper 144. Specifically, among the work models that have been swapped by the swapper 144, the multiplexer 145 rearranges those work models which may be executed in parallel into parallel. In Embodiment 1, the multiplexer 145 swaps the order of work models while comparing each two adjacent work models by using a bubble sort. Specifically, among work models that have been swapped by the swapper 144, the multiplexer 145 performs multiplexing beginning with the work model placed in the rear.

FIG. 11 depicts conditions upon which work models are multiplexed by the multiplexer 145. The multiplexer 145 multiplexes work models that have been swapped by the swapper 144, in accordance with the conditions illustrated in FIG. 11.

For example, as illustrated in FIG. 11, if "tables to be referenced/updated" by two work models to be compared are different, the multiplexer 145 rearranges such two work models in parallel. This is because if the "tables to be referenced/updated" by two models are different, such two models may be executed in parallel.

Also, if two work models to be compared are both "reference type" as illustrated in FIG. 11, the multiplexer 145 rearranges the two work models to be compared in parallel, irrespective of whether or not the "tables to be referenced/updated" are the same. This is because if two work models are "reference type", such two work models may be executed in parallel irrespective of whether the "tables to be referenced/updated" are the same.

Now, referring to FIGS. 12A and 12B, multiplexing performed by the multiplexer 145 will be described. FIG. 12A depicts an example of work models that have been swapped by the swapper 144. It should be noted that the work models illustrated in FIG. 12A are the same as the work models illustrated in FIG. 10B.

The multiplexer 145 swaps the work models illustrated in FIG. 12A in accordance with the conditions illustrated in FIG. 11. Specifically, as illustrated in FIG. 12B, the multiplexer 145 rearranges the work models M11, M21, and M12 in parallel, and also rearranges the work models M22 and M13 in parallel. The work models illustrated in FIG. 12B indicate that the work model M11, M21, and M12 are executed in parallel, and the work model M22 and M13 are executed in parallel.

Also, in addition to the multiplexing described above, the multiplexer 145 assigns information indicating that synchronization is to be performed (hereinafter, referred to as "synchronization information"). Specifically, the multiplexer 145 assigns synchronization information if the condition illustrated in the Remarks in FIG. 11 is met.

The above-mentioned processing will be described by way of an example. For example, suppose that two adjacent work models are placed in the order of "the work model M8 and the work model M9". Then, suppose that the work model M8 is a reference-type one, and the work model M9 is an update-type one. In such a case, the multiplexer 145 assigns synchronization information between the work model M8 and the work model M9 so that the work model M9 is executed after execution of the work model M8 is finished. This is to prevent the work model M9 from being executed while the reference-type work model M8 is being executed.

Referring to FIGS. 12C and 12D, synchronization information assignment performed by the multiplexer 145 will be described. FIG. 12C depicts an example of synchronization information assignment performed by the multiplexer 145. FIG. 12C illustrates an example of work models that have been swapped by the swapper 144. It is assumed that among the work models illustrated in FIGS. 12C and 12D, work models M31 to M37 and M39 all reference or update the same table. That is, among the work models illustrated in FIGS. 12C and 12D, a work model M38 performs updating to a table different from the table updated by the work models M31 to M37 and M39.

In such a case, the multiplexer 145 rearranges the work models illustrated in FIG. 12C into the order as illustrated in FIG. 12D, in accordance with the conditions illustrated in FIG. 11. Then, the multiplexer 145 assigns synchronization information between the work models M31 to M33 and the work model M34. That is, the multiplexer 145 assigns synchronization information indicating that the work model M34 is not to be executed until execution of the work models M31 to M33 is finished. Thus, the multiplexer 145 can prevent the work model M34 from being executed before execution of the work models M31 to M33 is finished.

The multiplexer 145 also assigns synchronization information between the work models M35 and M36, and the work models M37 and M38. Thus, the multiplexer 145 can prevent the work models M37 and M38 from being executed before execution of the work models M35 and M36 is finished.

Returning to the explanation of FIG. 2, the scenario creating unit 146 creates a scenario on the basis of the work models that have been multiplexed by the multiplexer 145, and stores the created scenario into the scenario storing unit 152. The scenario created by the scenario creating unit 146 makes access to the DB server 15 in the same order in which the DB server 15 is accessed when testing is performed by the tester. Thus, the scenario created by the scenario creating unit 146 makes it possible to determine pass/fail of testing correctly. In addition, in the scenario created by the scenario creating unit 146, work models that meet the conditions illustrated in FIG. 11 are executed in parallel. Thus, the scenario created by the scenario creating unit 146 can reduce the time required for test execution.

It should be noted that in cases such as when it is not necessary to reduce the time required for test execution, the scenario creating unit 146 may create a scenario on the basis of work models sorted by the sorter 143.

[Scenario Creation Procedure]

Figure 13:
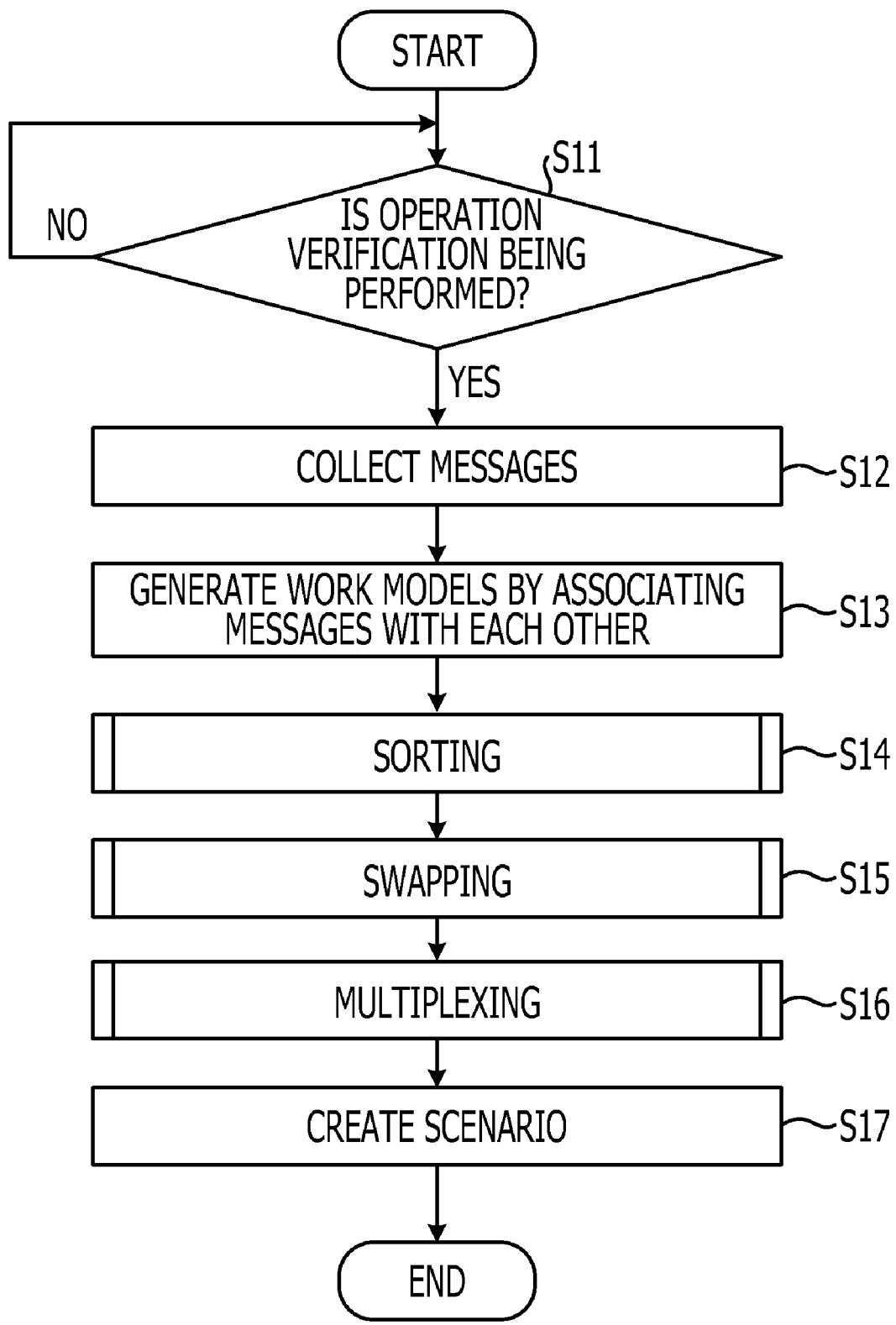
FIG. 13 depicts a flowchart of a scenario creation procedure performed by a scenario creating apparatus.

Next, referring to FIG. 13, the procedure of scenario creation performed by the scenario creating apparatus 100 will be described. FIG. 13 depicts a flowchart of a scenario creation procedure performed by the scenario creating apparatus 100.

As illustrated in FIG. 13, when operation of the information processing system 1 is being verified by the tester (Yes in operation S11), the collector 141 of the scenario creating apparatus 100 collects messages transmitted/received between individual servers (operation S12).

Subsequently, among the messages collected by the collector 141, the association unit 142 associates messages transmitted/received within the same transactions with each other, thereby generating work models (operation S13).

Subsequently, the sorter 143 performs sorting (operation S14). Specifically, the sorter 143 sorts the work models generated by the association unit 142 in ascending order of the start time of access to the DB server 15. It should be noted that the sorting performed by the sorter 143 will be described later with reference to FIG. 14.

Subsequently, the swapper 144 performs swapping (operation S15). Specifically, the swapper 144 swaps the order of the work models sorted by the sorter 143 so that work models of the same attribute become adjacent to each other. It should be noted that the swapping performed by the swapper 144 will be described later with reference to FIGS. 15 and 16.

Subsequently, the multiplexer 145 performs multiplexing (operation S16). Specifically, the multiplexer 145 multiplexes the work models that have been swapped by the swapper 144. It should be noted that the multiplexing performed by the multiplexer 145 will be described later with reference to FIGS. 17 to 21.

Then, the scenario creating unit 146 creates a scenario on the basis of the work models that have been multiplexed by the multiplexer 145, and stores the created scenario into the scenario storing unit 152 (operation S17).

[Sorting Procedure]

Figure 14:
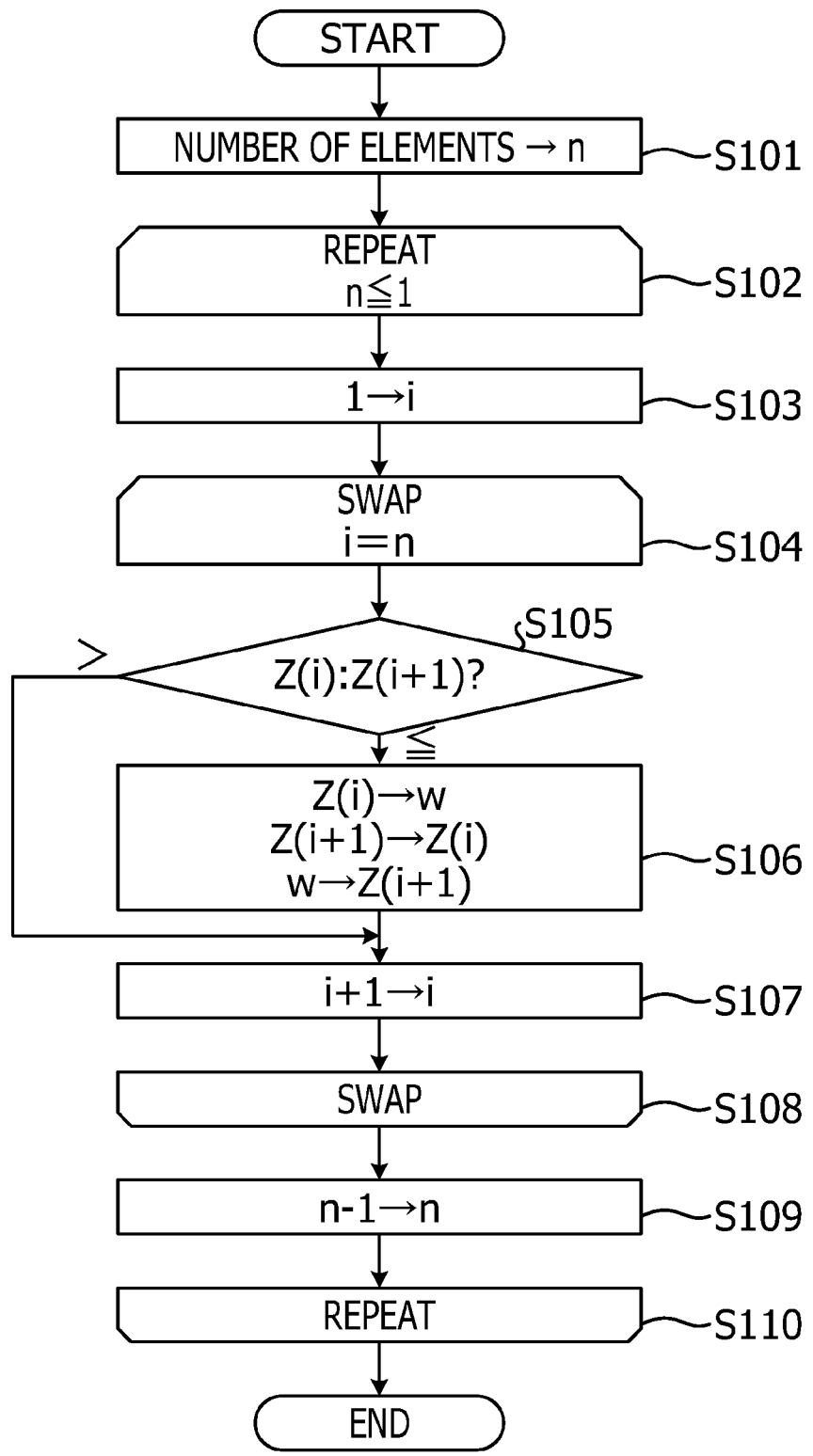
FIG. 14 depicts a flowchart of a sorting procedure performed by a sorter.

Next, referring to FIG. 14, the procedure of the sorting illustrated in operation S14 in FIG. 13 will be described. FIG. 14 depicts a flowchart of a sorting procedure performed by the sorter 143. In the following, the description will be given by way of the examples illustrated in FIGS. 8A and 8B.

First, in the example illustrated in FIG. 14, the sorter 143 merges work models stored in the work model storing unit 151, and then substitutes each of the merged work models into an array $Z(i)$. For example, when the work model storing unit 151 is in the state as illustrated in FIG. 8A, the sorter 143 substitutes the work models M22, M21, M13, M12, and M11 into $Z(1)$ to $Z(5)$, respectively.

Then, as illustrated in FIG. 14, the sorter 143 substitutes the number of elements into a variable n (operation S101). The term "number of elements" as used herein refers to the number of work models stored in the work model storing unit 151. For example, when the work model storing unit 151 is in the state illustrated in FIG. 8A, the number of work models is "5", so the sorter 143 substitutes "5" into n.

Subsequently, the sorter 143 repeats the procedure in operations S102 to S110 until a condition "$n \leq 1$" is met. Here, since "n=5", the condition "$n \leq 1$" is not met. Therefore, the sorter 143 substitutes "1" into a variable i (operation S103).

Then, the sorter 143 repeats the procedure in operations S104 to S108 until a condition "i=n" is met. Here, since "n=5" and "i=1", the condition "i=n" is not met. Therefore, the sorter 143 compares the start time of access to the DB server 15 in the work model of $Z(i)$, with the start time of access to the DB server 15 in the work model of $Z(i+1)$ (operation S105).

Then, if the access start time in $Z(i)$ is not larger than the access start time in $Z(i+1)$, the sorter 143 swaps the work model substituted in $Z(i)$ and the work model substituted in $Z(i+1)$ (operation S106). Specifically, as illustrated in FIG. 14, after substituting the work model substituted in $Z(i)$ into a work variable w, the sorter 143 substitutes the work model substituted in $Z(i+1)$ into $Z(i)$, and substitutes the work model substituted in the work variable w into $Z(i+1)$.

It should be noted that the expression "time A is larger than time B" as used in this specification means that time A is closer to the current time than time B. In other words, the expression "time A is smaller than time B" means that time A is past with reference to time B.

On the other hand, if the access start time in $Z(i)$ is larger than the access start time in $Z(i+1)$, the sorter 143 does not swap the work model substituted in $Z(i)$ and the work model substituted in $Z(i+1)$.

Here, since "i=1", the sorter 143 compares $Z(1)$ and $Z(2)$ with each other. That is, in the case of the above-mentioned example, the sorter 143 compares the access start time in the work model M22 with the access start time in the work model M21. As illustrated in FIG. 8A, the access start time in the work model M22 is larger than the access start time in the work model M21, so the sorter 143 does not swap the order of the work model M22 and the work model M21.

Subsequently, the sorter 143 increments the variable i (operation S107). Here, the sorter 143 updates the variable i to "2". That is, since "n=5" and "i=2", the condition "i=n" in operation S104 is not met. Therefore, the sorter 143 performs the processing in operations S105 to S107. Specifically, the sorter 143 compares Z(2) with Z(3).

That is, in the case of the above-mentioned example, the sorter 143 compares the access start time in the work model M21 with the access start time in the work model M13. As illustrated in FIG. 8A, the access start time in the work model M21 is not larger than the access start time in the work model M13, so the sorter 143 swaps the order of the work model M21 and the work model M13.

In this way, the sorter 143 repeats the procedure in operations S104 to S108 until the condition "i=n" in operation S104 is met. Then, when the condition "i=n" is met, the sorter 143 decrements the variable n (operation S109). Then, the sorter 143 repeats the procedure in operations S102 to 5110 until the condition "n≦1" in operation S102 is met.

[Swapping Procedure]

Figure 15:
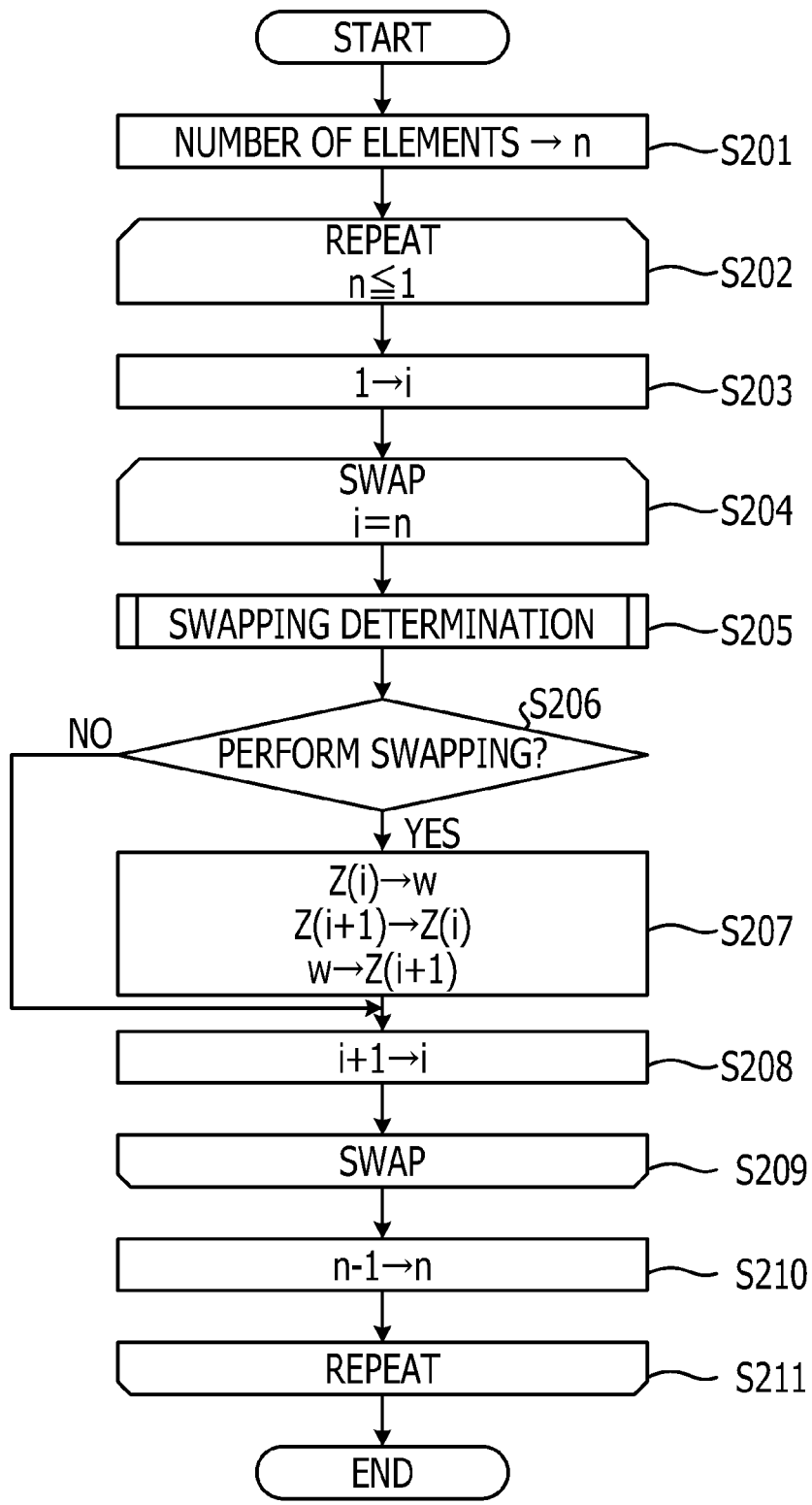
FIG. 15 depicts a flowchart of a swapping procedure performed by a swapper.

Next, referring to FIG. 15, a description will be given of the procedure of the swapping illustrated in operation S15 in FIG. 13. FIG. 15 depicts a flowchart of a swapping procedure performed by the swapper 144. It should be noted that in FIG. 15, the description will be given by way of the example illustrated in FIG. 10. Also, in FIG. 15, it is assumed that each of work models obtained after executing the procedure illustrated in FIG. 14 is substituted into an array Z(i). That is, here, the work models M13, M22, M21, M12, and M11 are substituted into Z(1) to Z(5), respectively.

First, as illustrated in FIG. 15, the swapper 144 substitutes the number of elements into a variable n (operation S201). In the case of the above-mentioned example, the number of work models is "5", so the swapper 144 substitutes "5" into n.

Subsequently, the swapper 144 repeats the procedure in operations S202 to S211 until a condition "n≦1" is met. Here, since "n=5", the condition "n≦1" is not met. Therefore, the swapper 144 substitutes "1" into a variable i (operation S203).

Then, the swapper 144 repeats the procedure in operations S204 to S209 until a condition "i=n" is met. Here, since "n=5" and "i=1", the condition "i=n" is not met. Therefore, the swapper 144 performs swapping determination by comparing Z(i) with Z(i+1) (operation S205). It should be noted that the swapping determination performed by the swapper 144 will be described later with reference to FIG. 16.

If it is determined as a result of the swapping determination to "perform swapping" (Yes in operation S206), the swapper 144 swaps the work model substituted in Z(i) and the work model substituted in Z(i+1) (operation S207). Specifically, as illustrated in FIG. 15, after substituting the work model substituted in Z(i) into a work variable w, the swapper 144 substitutes the work model substituted in Z(i+1) into Z(i), and substitutes the work model substituted in the work variable w into Z(i+1).

If it is determined as a result of the swapping determination "not to perform swapping" (No in operation S206), the swapper 144 does not swap the work model substituted in Z(i) and the work model substituted in Z(i+1).

Subsequently, the swapper 144 increments the variable i (operation S208). Here, the swapper 144 updates the variable i to "2". That is, since "n=5" and "i=2", the condition "i=n" in operation S204 is not met. Therefore, the swapper 144 performs the processing in operations S205 to S208.

In this way, the swapper 144 repeats the procedure in operations S204 to S208 until the condition "i=n" in operation S204 is met. Then, when the condition "i=n" is met, the swapper 144 decrements the variable n (operation S210). Then, the swapper 144 repeats the procedure in operations S202 to S211 until the condition "n≦1" in operation S202 is met.

[Swapping Procedure]

Figure 16:
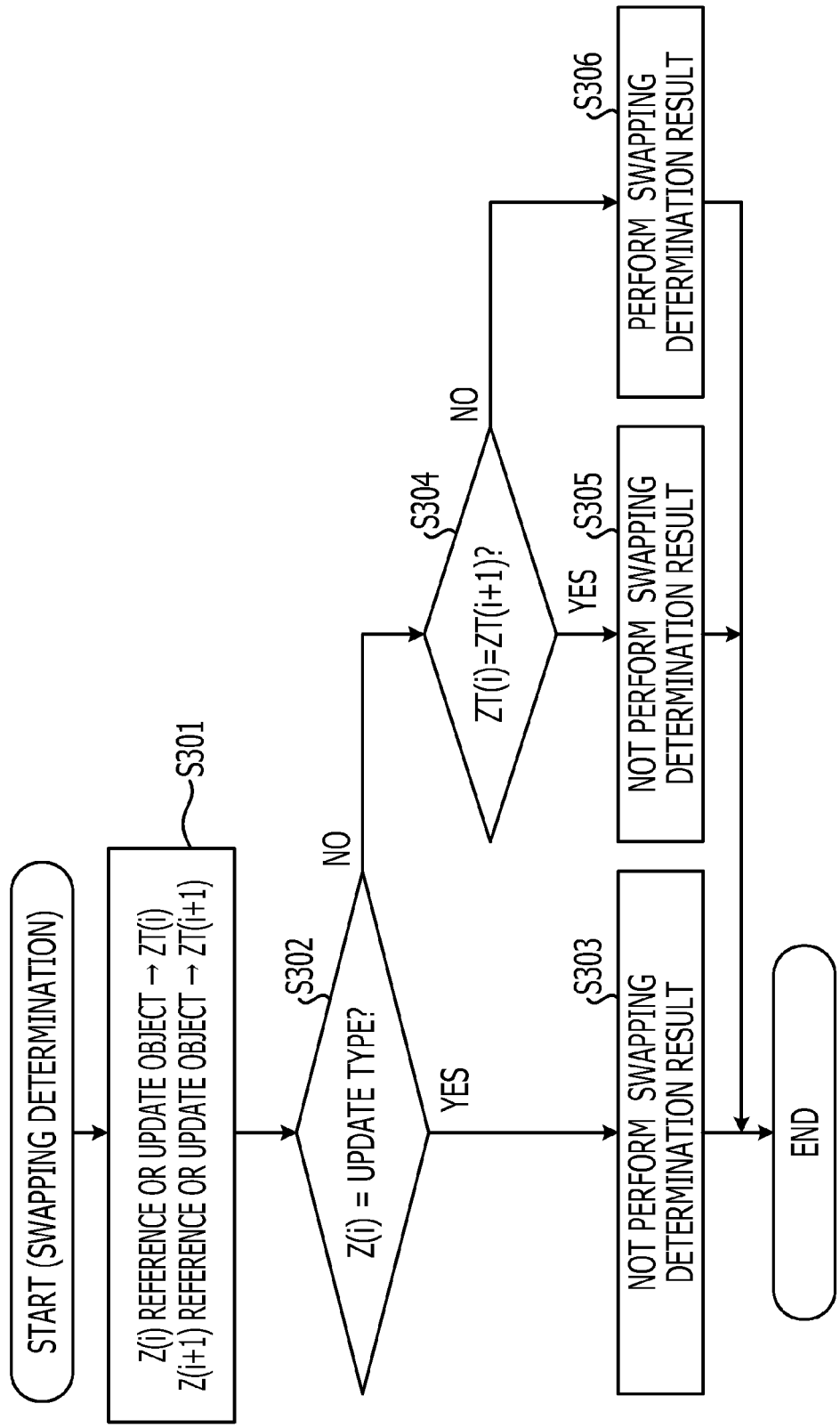
FIG. 16 depicts a flowchart of a swapping determination procedure performed by a swapper.

Next, referring to FIG. 16, a description will be given of the procedure of the swapping determination illustrated in operation S205 in FIG. 15. FIG. 16 depicts a flowchart of a swapping determination procedure performed by the swapper 14. It should be noted that in FIG. 16, as in the example illustrated in FIG. 15, it is assumed that each of work models obtained after executing the procedure illustrated in FIG. 14 is substituted into an array Z(i).

When performing swapping determination, first, the swapper 144 substitutes the name of a table referenced or updated in the work model of Z(i) into a variable ZT(i) (operation S301). Also, the swapper 144 substitutes the name of a table referenced or updated in the work model of Z(i+1) into a variable ZT(i+1) (operation S301).

Subsequently, if the work model of Z(i) is "update type" (Yes in operation S302), the swapper 144 determines "not to perform swapping" (operation S303). Specifically, the swapper 144 determines not to perform swapping of Z(i) and Z(i+1). This indicates a case in which, among the conditions illustrated in FIG. 9, the "attribute of current work model" is "update type".

On the other hand, if the work model of Z(i) is not "update type" (No in operation S302), the swapper 144 determines whether or not ZT(i) and ZT(i+1) are equal (operation S304). Then, if ZT(i) and ZT(i+1) are equal (Yes in operation S304), the swapper 144 determines "not to perform swapping" (operation S305). This indicates a case in which, among the conditions illustrated in FIG. 9, the "attribute of current work model" is "reference type (shared)" or "reference type (no lock)", and that the "tables to be referenced/updated" are the "same".

On the other hand, if ZT(i) and ZT(i+1) are different (No in operation S304), the swapper 144 determines to "perform swapping" (operation S306). This indicates a case in which, among the conditions illustrated in FIG. 9, the "attribute of current work model" is "reference type (shared)" or "reference type (no lock)", and that the "tables to be referenced/updated" are "different".

This will be described by way of the above-mentioned example. If "i=1", the work model of Z(i)=Z(1) is the work model M13, and the work model of Z(i+1)=Z(2) is the work model M22. As illustrated in FIG. 10, the attribute of the work model M13 is reference type (shared) (No in operation S302). Also, as illustrated in FIG. 10, the "tables to be referenced/updated" by the work model M13 and the work model M22 are both Table B and are thus the "same" (Yes in operation S304). Therefore, if "i=1", the swapper 144 determines not to swap the work model M13 and the work model M22.

[Multiplexing Procedure]

Figure 17:
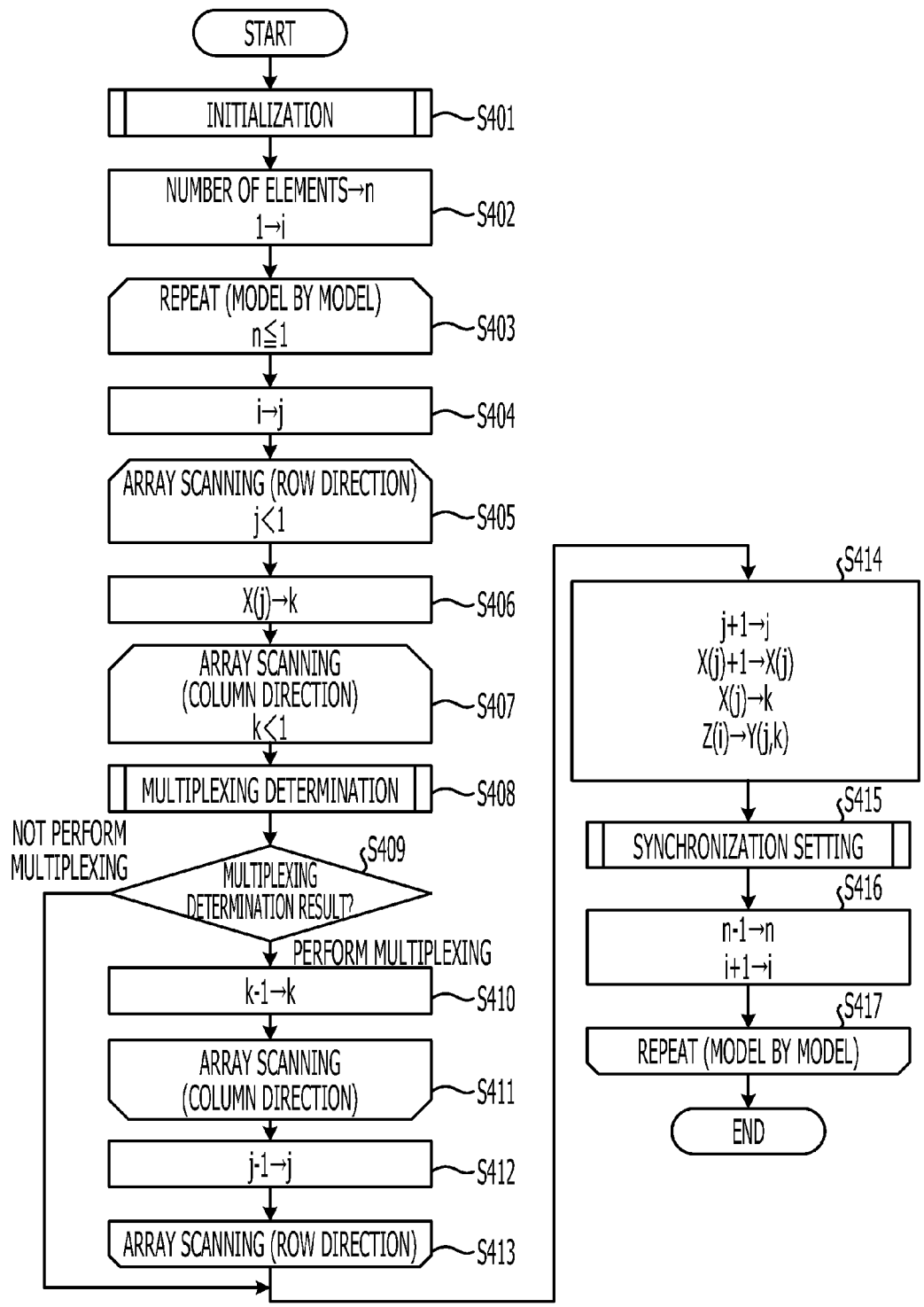
FIG. 17 depicts a flowchart of a multiplexing procedure performed by a multiplexer.

Next, referring to FIG. 17 and FIGS. 18A to 18D, the procedure of the multiplexing illustrated in operation S16 in FIG. 13 will be described. FIG. 17 depicts a flowchart of a multiplexing procedure performed by the multiplexer 145. FIGS. 18A to 18D are diagrams for explaining an example of multiplexing performed by the multiplexer 145.

FIG. 18A depicts work models M101 to M121 to be multiplexed. The work models M101 to M121 illustrated in FIG. 18A have been swapped by the swapper 144, and are substituted into Z(1) to Z(21), respectively.

FIG. 18B depicts an array Y(j, k) used when multiplexing is performed by the multiplexer 145. The multiplexer 145 performs multiplexing by substituting a work model substituted in an array Z(i) into the array Y(j, k). Here, of the array Y(j, k), work models substituted into the same row (j) indicate that these work models are executed in parallel.

FIG. 18C depicts an array X(j). Such an array X(j) indicates the number of work models stored in the row (j) of the array Y(j, k). FIG. 18D depicts an array W(j). Such an array W(j) indicates whether or not synchronization is to be performed in the row (j).

It should be noted that the array Y(j, k) illustrated in FIG. 18B, the array X(j) illustrated in FIG. 18C, and the array W(j) illustrated in FIG. 18D each indicate a state after multiplexing is performed by the multiplexer 145.

Hereinbelow, the procedure illustrated in FIG. 17 will be described with reference to the examples illustrated in FIGS. 18A to 18D. It should be noted that in the initial state, the array Y(j, k) is empty.

First, as illustrated in FIG. 17, the multiplexer 145 performs initialization (operation S401). Specifically, the multiplexer 145 substitutes "0" into an array X(j) and an array W(j). It should be noted that the initialization performed by the multiplexer 145 will be described later with reference to FIG. 19.

Subsequently, the multiplexer 145 substitutes the number of elements into a variable n, and substitutes "1" into a variable i (operation S402). In the example illustrated in FIG. 18A, the number of work models is "21", so the multiplexer 145 substitutes "21" into n.

Subsequently, the multiplexer 145 repeats the procedure in operations S403 to S417 until a condition "n≦1" is met. Here, since "n=21", the condition "n≦1" is not met. Therefore, the multiplexer 145 substitutes "i" into a variable j (operation S404). Here, since "i=1", the multiplexer 145 substitutes "1" into the variable j.

Subsequently, the multiplexer 145 repeats the procedure in operations S405 to S413 until a condition "j<1" is met. Here, since "j=1", the condition "j<1" is not met. Therefore, the multiplexer 145 substitutes X(j) into a variable k (operation S406). Here, since "j=1", the multiplexer 145 substitutes "0" into the variable k.

Subsequently, the multiplexer 145 repeats the procedure in operations S407 to S411 until a condition "k<1" is met. Here, since "k=0", the condition "k<1" is met. Therefore, the multiplexer 145 decrements the variable j (operation S412). Here, since "j=1", the multiplexer 145 updates the variable j to a value "0" equal to "1" subtracted by "1".

Subsequently, the multiplexer 145 determines whether or not a condition "j<1" in operation S405 is met. Here, since "j=0", the condition "j<1" is met. Therefore, the multiplexer 145 performs the procedure in operation S414.

Specifically, the multiplexer 145 updates the variable j from "0" to "1". Also, the multiplexer 145 substitutes "X(j)+1" into X(j). Here, since "j=1" and "X(1)=0", the multiplexer 145 substitutes "0+1" into X(1). In addition, the multiplexer 145 substitutes X(j) into the variable k. Here, since "X(1)=1", the multiplexer 145 substitutes "1" into the variable k. Also, the multiplexer 145 substitutes Z(i) into Y(j, k). Here, since "i=1", "j=1", "k=1", and the work model M101 is substituted in Z(1), as illustrated in FIG. 18B, the multiplexer 145 substitutes the work model M101 into Y(1, 1).

Subsequently, the multiplexer 145 performs synchronization setting (operation S415). It should be noted that the synchronization setting performed by the multiplexer 145 will be described later with reference to FIG. 21. Subsequently, the multiplexer 145 decrements the variable n, and increments the variable i. Here, the multiplexer 145 updates the variable n from "21" to "20", and updates the variable i from "1" to "2".

Subsequently, the multiplexer 145 determines whether or not the condition "n≦1" in operation S403 is met. Here, since "n=20", the condition "n≦1" is not met. Therefore, the multiplexer 145 substitutes i into the variable j (operation S404). Here, since "i=2", the multiplexer 145 substitutes "2" into the variable j.

Subsequently, the multiplexer 145 determines whether or not the condition "j<1" in operation S405 is met. Here, since "j=2", the condition "j<1" is not met. Therefore, the multiplexer 145 substitutes X(j) into the variable k (operation S406). Here, since "j=2", and "X(2)=0", the multiplexer 145 substitutes "0" into the variable k.

Subsequently, the multiplexer 145 determines whether or not the condition "k<1" in operation S407 is met. Here, since "k=0", the condition "k<1" is met. Therefore, the multiplexer 145 updates the variable j from "2" to "1" (operation S412).

Subsequently, the multiplexer 145 determines whether or not the condition "j<1" in operation S405 is met. Here, since "j=1", the condition "j<1" is not met. Therefore, the multiplexer 145 substitutes X(j) into the variable k (operation S406). Here, since "j=1", and "X(1)=1", the multiplexer 145 substitutes "1" into the variable k.

Subsequently, the multiplexer 145 determines whether or not the condition "k<1" in operation S407 is met. Here, since "k=1", the condition "k<1" is not met. Therefore, the multiplexer 145 performs multiplexing determination (operation S408). It should be noted that the multiplexing determination performed by the multiplexer 145 will be described later with reference to FIG. 20.

If it is determined to perform multiplexing as a result of the multiplexing determination, the multiplexer 145 decrements the variable k (operation S410). On the other hand, if it is determined not to perform multiplexing, the multiplexer 145 performs the procedure in operation S414.

It should be noted that here, since the multiplexer 145 determines not to perform multiplexing, the multiplexer 145 performs the procedure in operation S414. Specifically, the multiplexer 145 updates the variable j from "1" to "2". Also, the multiplexer 145 substitutes "X(j)+1" into X(j). Here, since "j=2" and "X(2)=0", the multiplexer 145 substitutes "0+1" into X(2). Also, the multiplexer 145 substitutes X(j) into the variable k. Here, since "X(2)=1", the multiplexer 145 substitutes "1" into the variable k. In addition, the multiplexer 145 substitutes Z(i) into Y(j, k). Here, since "i=2", "j=2", "k=1", and the work model M102 is substituted in Z(2), as illustrated in FIG. 18B, the multiplexer 145 substitutes the work model M102 into Y(2, 1).

In this way, the multiplexer 145 performs the above-described procedure until the condition "n≦1" in operation S403 is met. Thus, as illustrated in FIG. 18B, the work models M101 to M121 substituted in the array Z(i) illustrated in FIG. 18A are substituted into the array Y(j, k). The example illustrated in FIG. 18B illustrates that work models substituted in the same row are multiplexed. For example, it is illustrated that the work models M101 and M103 are multiplexed. Then, the example illustrated in FIG. 18B illustrates that after the work models M101 and M103 are executed in parallel, the work models M102, M105, and M107 are executed in parallel. Then, the example illustrated in FIG. 18B illustrates that the work models M118 and M120 are executed lastly.

[Initialization Procedure]

Next, referring to FIG. 19, the procedure of the initialization illustrated in operation S401 in FIG. 17 will be described.

Figure 19:
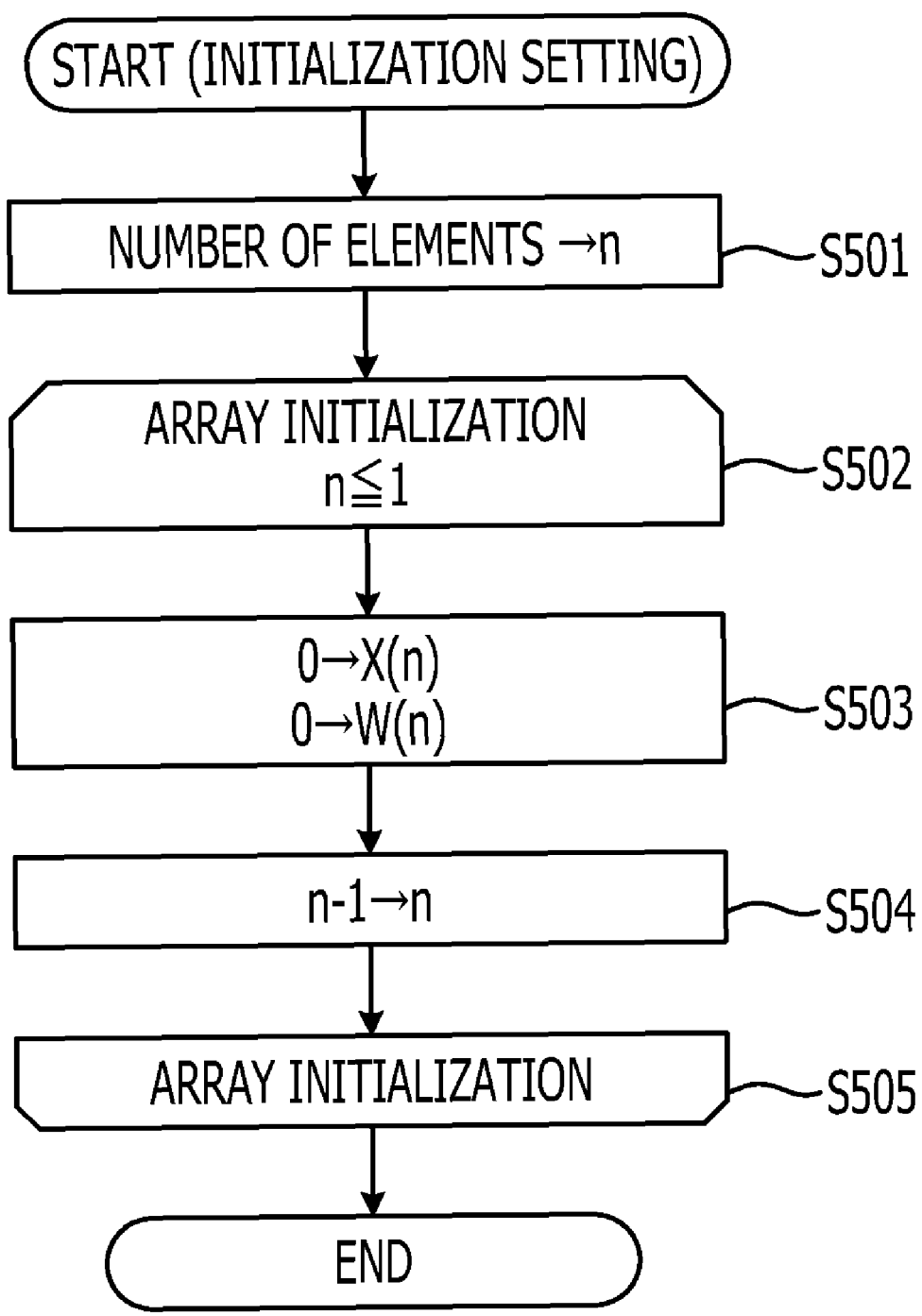
FIG. 19 depicts a flowchart of an initialization procedure performed by a multiplexer.

FIG. 19 depicts a flowchart of an initialization procedure performed by the multiplexer 145.

As illustrated in FIG. 19, the multiplexer 145 first substitutes the number of elements into a variable n (operation S501). Subsequently, the multiplexer 145 repeats the procedure in operations S502 to S505 until a condition "n≦1" is met.

Specifically, the multiplexer 145 substitutes "0" into an array X(n) and an array W(n) (operation S503). Subsequently, the multiplexer 145 decrements the variable n (operation S504). That is, the multiplexer 145 substitutes "0" into elements X(1) to X(n) of the array X(n), and elements W(1) to W(n) of the array W(n).

[Multiplexing Determination Procedure]

Figure 20:
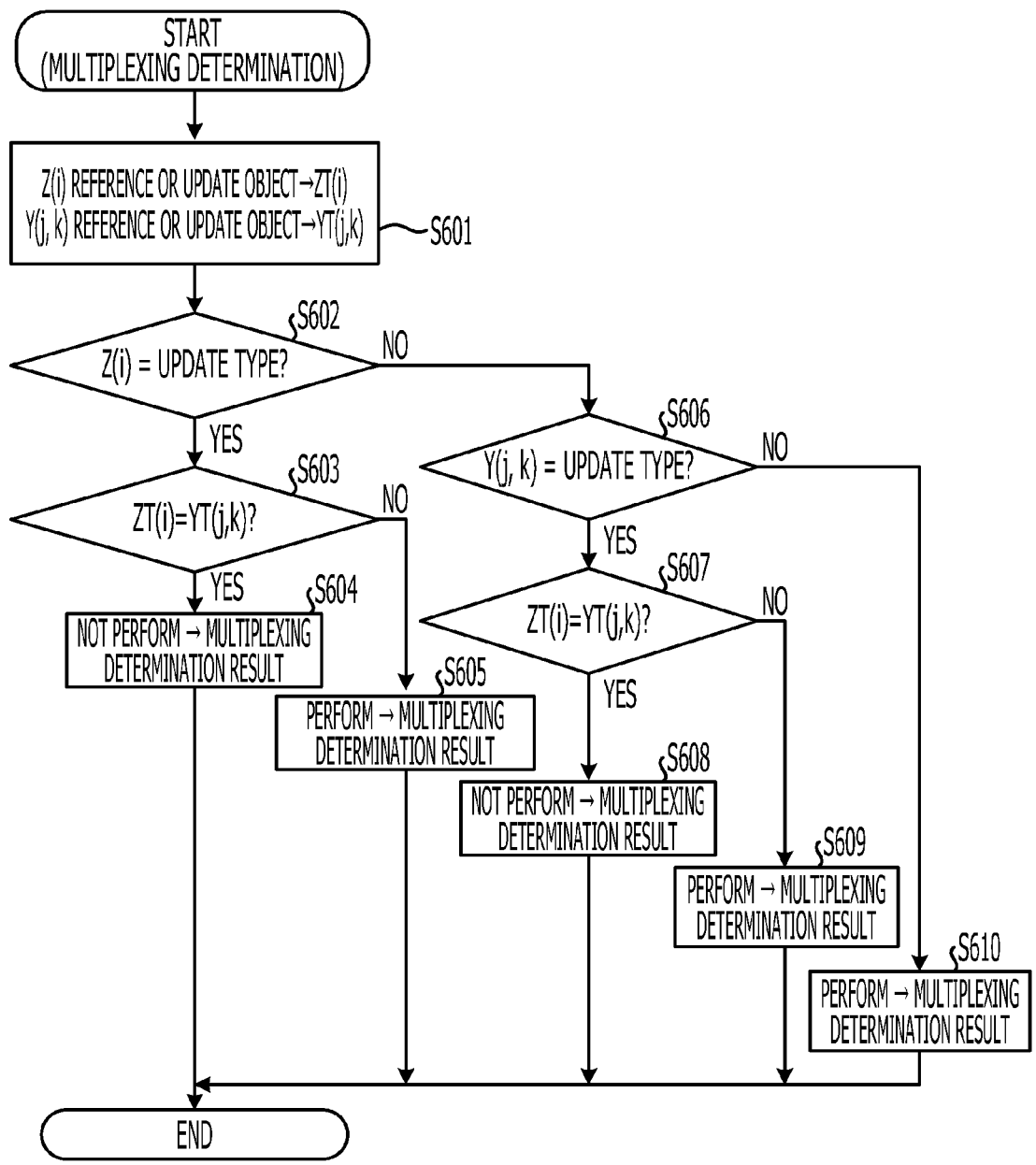
FIG. 20 depicts a flowchart of a multiplexing determination procedure performed by a multiplexer.

Next, referring to FIG. 20, the procedure of the multiplexing determination illustrated in operation S408 in FIG. 17 will be described. FIG. 20 depicts a flowchart of a multiplexing determination procedure performed by the multiplexer 145.

When performing multiplexing determination, first, the multiplexer 145 substitutes the name of a table referenced or updated in the work model of Z(i) into a variable ZT(i) (operation S601). Also, the multiplexer 145 substitutes the name of a table referenced or updated in the work model of Y(j, k) into a variable YT(j, k) (operation S601).

Subsequently, the multiplexer 145 determines "not to perform multiplexing" if the work model of Z(i) is "update type" (Yes in operation S602), and ZT(i) and YT(j, k) are equal (Yes in operation S603) (operation S604).

On the other hand, the multiplexer 145 determines to "perform multiplexing" if the work model substituted in Z(i) is "update type" (Yes in operation S602), and ZT(i) and YT(j, k) are different (No in operation S603) (operation S605).

If the work model substituted in Z(i) is not "update type" (No in operation S602), the multiplexer 145 determines whether or not the work model substituted in Y(j, k) is "update type" (operation S606).

Then, if the work model substituted in Y(j, k) is "update type" (Yes in operation S606), and ZT(i) and YT(j, k) are equal (Yes in operation S607), the multiplexer 145 determines "not to perform multiplexing" (operation S608).

On the other hand, if the work model substituted in Y(j, k) is "update type" (Yes in operation S606), and ZT(i) and YT(j, k) are different (No in operation S607), the multiplexer 145 determines to "perform multiplexing" (operation S609).

Also, if the work model substituted in Y(j, k) is not "update type" (No in operation S606), the multiplexer 145 determines to "perform multiplexing" (operation S610). In this way, the multiplexer 145 determines whether or not to perform multiplexing, in accordance with the conditions illustrated in FIG. 11.

[Synchronization Setting Procedure]

Figure 21:
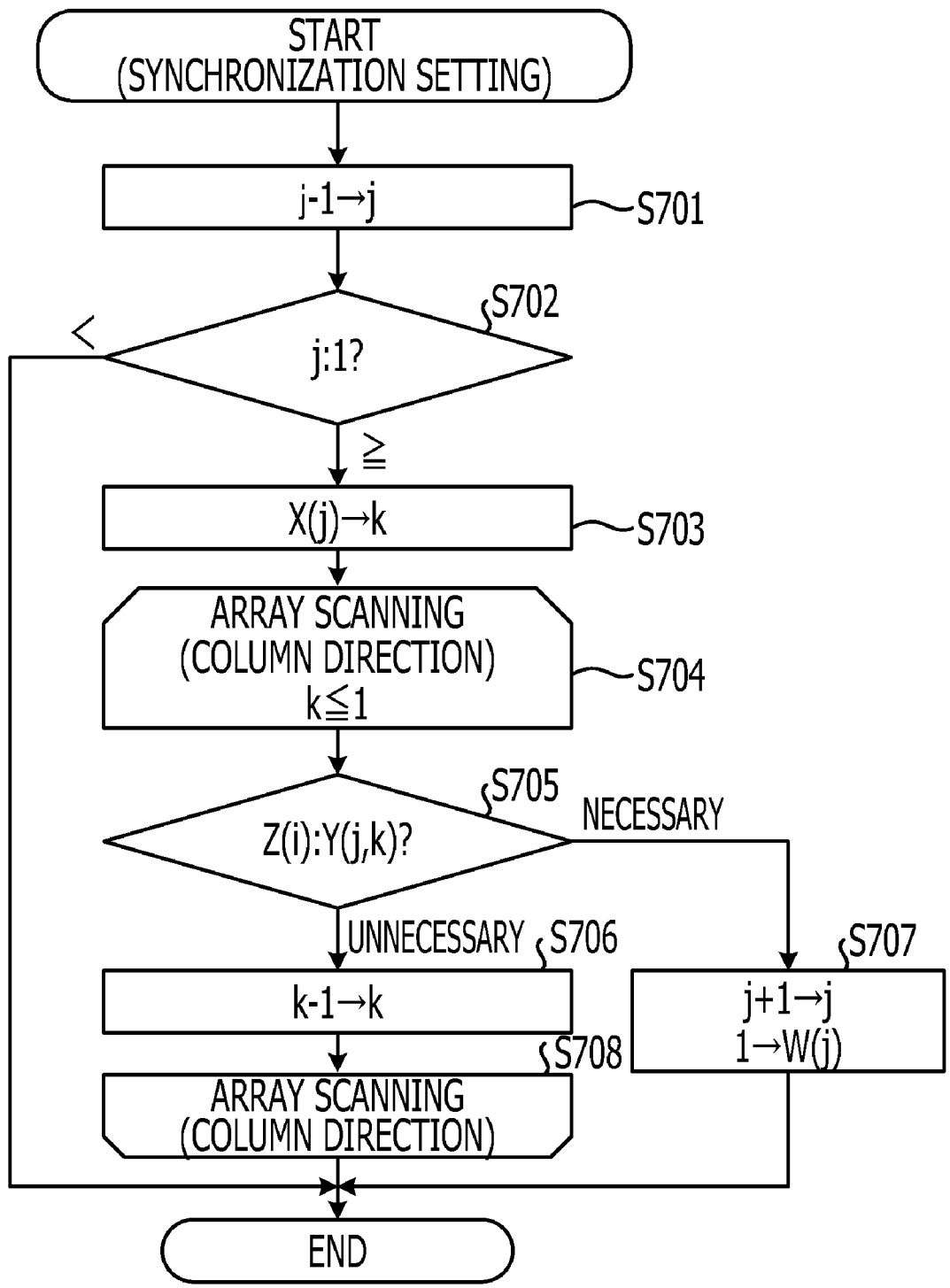
FIG. 21 depicts a flowchart of a synchronization setting procedure performed by a multiplexer.

Next, referring to FIG. 21, a description will be given of the procedure of the synchronization setting illustrated in operation S415 in FIG. 17. FIG. 21 depicts a flowchart of a synchronization setting procedure performed by the multiplexer 145.

As illustrated in FIG. 21, when performing synchronization setting, the multiplexer 145 first decrements a variable j (operation S701). Subsequently, the multiplexer 145 determines whether or not the variable j is smaller than "1" (operation S702).

Then, if the variable j is smaller than "1", the multiplexer 145 ends the processing. On the other hand, if the variable j is not smaller than "1", the multiplexer 145 substitutes the value of X(j) into a variable k (operation S703).

Subsequently, the multiplexer 145 repeats the procedure in operations S704 to S708 until a condition "k≦1" is met.

Specifically, the multiplexer 145 compares Z(i) with Y(j, k), and if Z(i) is update type and Y(j, k) is reference type, the multiplexer 145 determines that synchronization setting is unnecessary (operation S705). Then, the multiplexer 145 decrements the variable k (operation S706).

On the other hand, if Z(i) is not update type, or if Y(j, k) is not reference type, the multiplexer 145 determines that synchronization setting is necessary (operation S705). Then, the multiplexer 145 increments the variable j, and substitutes "1" into W(j) (operation S707).

For example, if the multiplexer 145 has performed multiplexing with respect to the work models M101 to M121 illustrated in FIG. 18A, the multiplexer 145 substitutes the values illustrated in FIG. 18D into the array W(j). This indicates that of the array Y(j, k), synchronization information is assigned to the rows of "j=3 to 6".

Advantages of Embodiment 1

As described above, the scenario creating apparatus 100 according to Embodiment 1 collects messages transmitted/received between individual servers, and associates messages transmitted/received within the same transactions with each other to generate work models. Then, the scenario creating apparatus 100 sorts the generated work models in ascending order of the start time of access to the DB server 15, thereby creating a scenario. Thus, the scenario creating apparatus 100 can create a scenario that makes it possible to determine pass/fail of testing correctly.

In addition, since the scenario creating apparatus 100 according to Embodiment 1 multiplexes the work models sorted in ascending order of the start time of access to the DB server 15, it is possible to create a scenario that requires a short test execution time.

Further, since the scenario created by the scenario creating apparatus 100 has been multiplexed, the scenario can be also used for load testing. Also, since the scenario created by the scenario creating apparatus 100 retains messages transmitted/received between individual servers, when the result of test verification is NG, it is possible to identify between which servers an error has occurred. Thus, use of the scenario generated by the scenario creating apparatus 100 makes it possible to identify the location of an error with ease and in a short time.

Embodiment 2

Incidentally, the scenario creating apparatus or the like disclosed by this application may be implemented in various other modes other than the above-described embodiment. Accordingly, in Embodiment 2, another embodiment of the scenario creating apparatus or the like disclosed by this application will be described.

[Attribute of Work Model]

Embodiment 1 mentioned above illustrates an example in which, as illustrated in FIGS. 9 and 11, it is determined with respect to two adjacent work models whether or not the "tables to be referenced/updated" are the same. Now, a case is also conceivable in which a plurality of tables are referenced or updated by a single work model. In such a case, the swapper 144 or the multiplexer 145 determines the "tables to be referenced/updated" to be the "same" if there is an overlap of even a single table referenced or updated by two work models to be compared. In other words, the swapper 144 or the multiplexer 145 determines the "tables to be referenced/updated" to be "different" if the tables referenced or updated by two work models to be compared are all different.

For example, in a case when the current work model performs updating to Tables A, B, and C, and the immediately preceding work model performs referencing to Tables C, D, and E, the swapper 144 or the multiplexer 145 determines the "tables to be referenced/updated" by the current work model and the immediately preceding work model to be the "same". This is because both the work models perform updating or referencing to Table C.

Also, for example, in a case when the current work model performs updating to Tables A, B, and C, and the immediately preceding work model performs referencing to Tables D and E, the swapper 144 or the multiplexer 145 determines the "tables to be referenced/updated" by the current work model and the immediately preceding work model to be "different". This is because both the work models perform referencing or updating to tables that are all different.

[Program]

The various kinds of processing described in Embodiment 1 above can be implemented by executing a program prepared in advance by a computer such as a personal computer or a workstation. Accordingly, in the following, with reference to FIG. 22, a description will be given of an example of a computer that executes a scenario creating program having the same function as the scenario creating apparatus 100 according to Embodiment 1 mentioned above.

Figure 22:
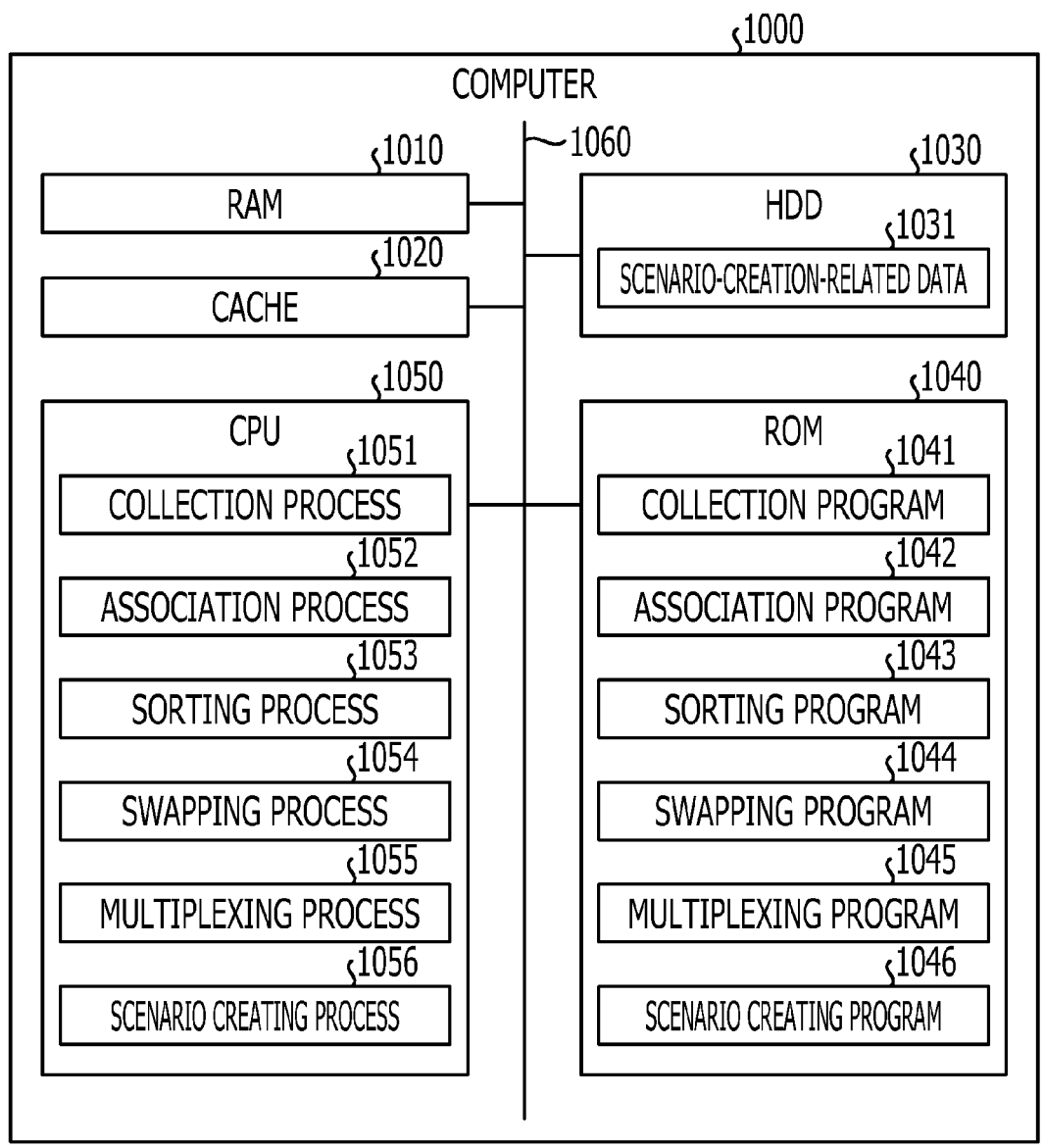
FIG. 22 depicts a computer that executes a scenario creating program.
Figure 23:
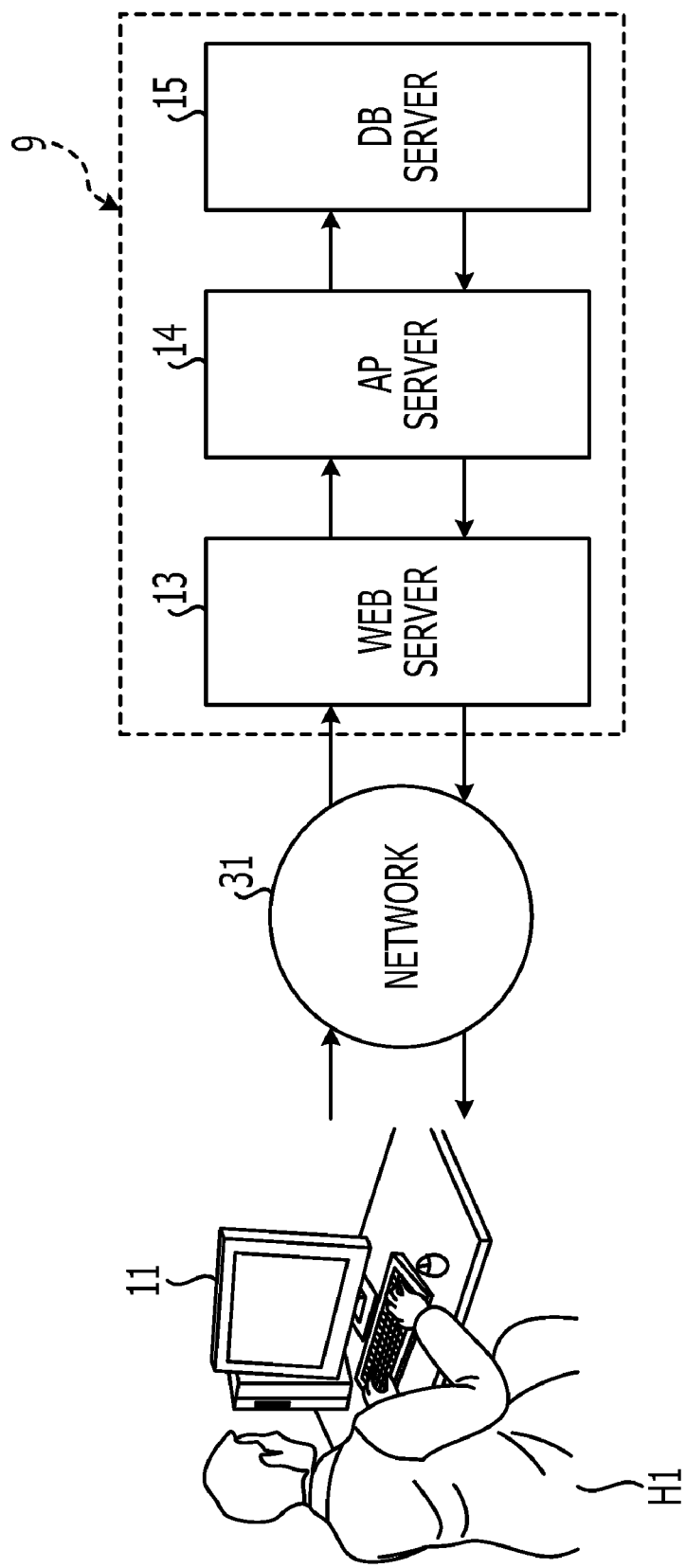
FIG. 23 depicts an example of testing technique according to the related art.

FIG. 22 depicts a computer that executes a scenario creating program. As illustrated in FIG. 22, a computer 1000 has a RAM (Random Access Memory) 1010, a cache 1020, an HDD 1030, a ROM (Read Only Memory) 1040, and a CPU (Central Processing Unit) 1050. The RAM 1010, the cache 1020, the HDD 1030, the ROM 1040, and the CPU 1050 are connected via a bus 1060.

In the ROM 1040, a scenario creating program that exhibits the same function as the scenario creating apparatus 100 according to Embodiment 1 mentioned above is stored in advance. Specifically, in the ROM 1040, a collection program 1041, an association program 1042, a sorting program 1043, a swapping program 1044, a multiplexing program 1045, and a scenario creating program 1046 are stored.

Then, the CPU 1050 reads the collection program 1041, the association program 1042, the sorting program 1043, the swapping program 1044, the multiplexing program 1045, and the scenario creating program 1046 to execute these programs. Thus, as illustrated in FIG. 22, the collection program 1041 becomes a collection process 1051, the association program 1042 becomes an association process 1052, and the sorting program 1043 becomes a sorting process 1053. In addition, the swapping program 1044 becomes a swapping process 1054, the multiplexing program 1045 becomes a multiplexing process 1055, and the scenario creating program 1046 becomes a scenario creating process.

It should be noted that the collection process 1051 corresponds to the collector 141 illustrated in FIG. 2, the association process 1052 corresponds to the association unit 142 illustrated in FIG. 2, and the sorting process 1053 corresponds to the sorter 143 illustrated in FIG. 2. In addition, the swapping process 1054 corresponds to the swapper 144 illustrated in FIG. 2, the multiplexing process 1055 corresponds to the multiplexer 145 illustrated in FIG. 2, and the scenario creating process 1056 corresponds to the scenario creating unit 146 illustrated in FIG. 2.

As illustrated in FIG. 22, the HDD 1030 is provided with scenario-creation-related data 1031. The scenario-creation-related data 1031 corresponds to the work model storing unit 151 or the scenario storing unit 152 illustrated in FIG. 2.

It should be noted that the programs 1041 to 1046 mentioned above may not necessarily be stored in the ROM 1040. For example, the programs 1041 to 1046 may be stored on a "portable physical medium" inserted into the computer 1000, such as a flexible disc (FD), a CD-ROM, an MO disc, a DVD disc, a magneto-optical disc, and an IC card. Alternatively, the programs 1041 to 1046 may be stored on a "stationary physical medium" provided inside or outside the computer 1000, such as a hard disk drive (HDD). Alternatively, the programs 1041 to 1046 may be stored on "another computer (or server)" connected to the computer 1000 via a public circuit, the Internet, the LAN, the WAN, or the like. Then, the computer 1000 may execute the programs by reading the programs from the flexible disc or the like mentioned above.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A scenario creating apparatus which creates a scenario for verifying operation of an information processing system in which a plurality of servers including a database server are coupled, comprising a processor to execute a process including:
   collecting messages transmitted and received between the plurality of servers, when operation of the information processing system is being verified by a terminal apparatus that performs verification of operation;
   associating the collected messages with each other;
   sorting work models in ascending order of time at which access is made to the database server, the work models each being a group of the associated messages; and
   creating the scenario based on the sorted work models.

2. The scenario creating apparatus according to claim 1, wherein:
   the processor rearranges adjacent work models of the work models sorted by the sorter in parallel, when tables in the database server accessed by the adjacent work models are different, wherein
   processor creates the scenario based on the work models rearranged by the multiplexer.

3. The scenario creating apparatus according to claim 2, wherein the processor rearranges the adjacent work models of the sorted work models in parallel, when both the adjacent work models perform only referencing to the database server.

4. The scenario creating apparatus according to claim 2, wherein:
   the processor swaps an order of the work models sorted by the processor, so that update-type work models that perform updating to the database server become adjacent to each other, and work models that perform referencing to the database server become adjacent to each other, wherein
   the processor rearranges the work models swapped by the processor in parallel.

5. The scenario creating apparatus according to claim 4, wherein:
the processor maintains an order of an update-type work model and a reference type work model, when the reference-type work model is placed after the update-type work model, and tables accessed by the update-type work model and the reference-type work model are the same; and
the processor swaps an order of an update-type work model and a reference type work model, when the reference-type work model is placed after the update-type work model, and tables accessed by the update-type work model and the reference-type work model are different.

6. The scenario creating apparatus according to claim 4, wherein the processor swaps an order of a first reference-type work model and a second reference-type work model, when the first reference-type work model is placed after the second reference-type work model, and tables accessed by the first reference-type work model and the second reference-type work model are different.

7. A scenario creating method, comprising:
collecting messages transmitted and received between a plurality of servers, when operation of an information processing system in which the plurality of servers including a database server are coupled is being verified by a terminal apparatus that performs verification of operation;
associating the collected messages with each other;
sorting work models in ascending order of time when access is made to the database server, the work models each being a group of the associated messages; and
creating a scenario for verifying operation of the information processing system, based on the sorted work models.

8. The scenario creating message according to claim 7, further comprising:
rearranging adjacent work models of the work models sorted in parallel, when tables in the database server accessed by the adjacent work models are different, wherein
the creating creates the scenario based on the work models rearranged.

9. The scenario creating method according to claim 8, wherein the rearranging rearranges the adjacent work models of the sorted work models in parallel, when both the adjacent work models perform only referencing to the database server.

10. The scenario creating method according to claim 8, further comprising:
swapping an order of the work models sorted, so that update-type work models that perform updating to the database server become adjacent to each other, and work models that perform referencing to the database server become adjacent to each other, wherein
the rearranging rearranges the work models swapped in parallel.

11. The scenario creating method according to claim 10, wherein:
the swapping maintains an order of an update-type work model and a reference-type work model, if the reference-type work model is placed after the update type work model, and tables accessed by the update-type work model and the reference-type work model are the same; and
the swapping swaps an order of an update-type work model and a reference type work model, when the reference-type work model is placed after the update-type work model, and tables accessed by the update-type work model and the reference-type work model are different.

12. The scenario creating method according to claim 10, wherein:
the swapping swaps an order of a first reference-type work model and a second reference-type work model, when the first reference-type work model is placed after the second reference-type work model, and tables accessed by the first reference-type work model and the second reference-type work model are different.

13. A computer-readable storage medium which stores a scenario creating program for causing a processor to execute a scenario creating process, the scenario creating process including:
collecting messages transmitted and received between a plurality of servers, when operation of an information processing system in which the plurality of servers including a database server are connected is being verified by a terminal apparatus that performs verification of operation;
associating the collected messages with each other;
sorting work models in ascending order of time when access is made to the database server, the work models each being a group of the associated messages; and
creating a scenario for verifying operation of the information processing system, based on the sorted work models.

14. The computer-readable storage medium according to claim 13, the scenario creating process further including:
rearranging adjacent work models of the sorted work models in parallel, when tables in the database server accessed by the adjacent work models are different, wherein
the creating creates the scenario based on the rearranged work models.

15. The computer-readable storage medium according to claim 14, wherein the rearranging rearranges the adjacent work models of the sorted work models in parallel, when both the adjacent work models perform only referencing to the database server.

16. The computer-readable storage medium according to claim 14, the scenario creating process further including:
swapping an order of the sorted work models, so that update-type work models that perform updating to the database server become adjacent to each other, and work models that perform referencing to the database server become adjacent to each other, wherein
the rearranging rearranges the swapped work models in parallel.

17. The computer-readable storage medium according to claim 16, wherein:
the swapping maintains an order of an update-type work model and a reference-type work model, if the reference-type work model is placed after the update type work model, and tables accessed by the update-type work model and the reference-type work model are the same; and
the swapping swaps an order of an update-type work model and a reference type work model, when the reference-type work model is placed after the update-type work model, and tables accessed by the update-type work model and the reference-type work model are different.

18. The computer-readable storage medium according to claim 16, wherein:
the swapping swaps an order of a first reference-type work model and a second reference-type work model, when the first reference-type work model is placed after the second reference-type work model, and tables accessed by the first reference-type work model and the second reference-type work model are different.

* * * * *